(12) United States Patent
D'Amore et al.

(10) Patent No.: US 9,100,444 B2
(45) Date of Patent: Aug. 4, 2015

(54) SYSTEMS AND METHODS OF CREATIVE WORK COLLABORATIVE SYSTEMS

(71) Applicants: Brandon E. D'Amore, Sherman Oaks, CA (US); Joel P. Thatcher, Oroville, WA (US); Gregory A. Piccionelli, Westlake Village, CA (US)

(72) Inventors: Brandon E. D'Amore, Sherman Oaks, CA (US); Joel P. Thatcher, Oroville, WA (US); Gregory A. Piccionelli, Westlake Village, CA (US)

( * ) Notice: Subject to any disclaimer, the term of this patent is extended or adjusted under 35 U.S.C. 154(b) by 0 days.

(21) Appl. No.: 14/004,149

(22) PCT Filed: Dec. 28, 2012

(86) PCT No.: PCT/US2012/072176
§ 371 (c)(1),
(2) Date: Sep. 9, 2013

(87) PCT Pub. No.: WO2013/102141
PCT Pub. Date: Jul. 4, 2013

(65) Prior Publication Data
US 2014/0324968 A1   Oct. 30, 2014

Related U.S. Application Data

(60) Provisional application No. 61/581,585, filed on Dec. 29, 2011, provisional application No. 61/733,801, filed on Dec. 5, 2012.

(51) Int. Cl.
*G06F 15/16* (2006.01)
*H04L 29/08* (2006.01)
*H04L 29/06* (2006.01)

(52) U.S. Cl.
CPC ............. *H04L 67/22* (2013.01); *H04L 65/403* (2013.01); *H04L 67/00* (2013.01)

(58) Field of Classification Search
CPC ..................................................... H04L 65/403
USPC .......................................................... 709/204
See application file for complete search history.

(56) References Cited

U.S. PATENT DOCUMENTS

| 2003/0145020 A1 | 7/2003 | Ngo et al. |
| 2004/0216039 A1 | 10/2004 | Lane et al. |
| 2005/0120199 A1 | 6/2005 | Carter |
| 2007/0088595 A1 | 4/2007 | Robinson et al. |

(Continued)

OTHER PUBLICATIONS

U.S. Office Action dated Sep. 24, 2014, from related U.S. Appl. No. 13/953,354.

(Continued)

*Primary Examiner* — Glenford Madamba
(74) *Attorney, Agent, or Firm* — Foley & Lardner LLP

(57) ABSTRACT

Systems, methods, and tangible computer-readable storage mediums for tracking collaboration are presented. More particularly, embodiments relate to providing, using a processor, an environment for collaboration between users; and tracking, using the processor, information regarding the collaboration; such that the tracked information includes rights information regarding rights of the collaborating users. Some further embodiments include storing, in a non-transient, computer-readable storage medium, the rights information. Some further embodiments include determining compensation for at least one user based on the rights information. Some further embodiments include: storing, in a non-transient, computer-readable storage medium, initial content; and storing, in the storage medium, additional content, such that the additional content builds on the initial content.

24 Claims, 15 Drawing Sheets

(56) References Cited

U.S. PATENT DOCUMENTS

| | | |
|---|---|---|
| 2007/0250506 A1 | 10/2007 | Stevens et al. |
| 2008/0059892 A1 | 3/2008 | Nakamura |
| 2008/0072158 A1 | 3/2008 | Samele et al. |
| 2008/0133551 A1 | 6/2008 | Wensley et al. |
| 2009/0055477 A1 | 2/2009 | Flesher et al. |
| 2009/0106307 A1 | 4/2009 | Spivack |
| 2009/0259526 A1 | 10/2009 | Bechtel et al. |
| 2009/0311658 A1 | 12/2009 | Polivka |
| 2010/0212478 A1 | 8/2010 | Taub et al. |
| 2011/0026898 A1 | 2/2011 | Lussier et al. |
| 2013/0254298 A1 | 9/2013 | Lorphelin |

OTHER PUBLICATIONS

US Notice of Allowance dated Jan. 31, 2014, from related U.S. Appl. No. 13/730,778.

International Search Report and Written Opinion from related PCT application No. PCT/US2012/072176, mailed May 13, 2013, 9 pages.

FIG. 4 (Image CWCS 1)

(Image I1)
Inviter Example (Image I2)
Inviter Example (Image WP2)
Working Profile Example (Image WP3)
Working Profile Example Example of Collaborations
Choices 7 thru 9
(Image CC7-9)

FIG. 13  (Image CC7b-9b)   Example of Collaborations Choices 7b thru 9b (Image ESP1)

SYSTEMS AND METHODS OF CREATIVE WORK COLLABORATIVE SYSTEMS

CROSS-REFERENCE TO RELATED PATENT APPLICATIONS

This application is a U.S. National Stage of PCT Application No. PCT/US2012/072176, filed Dec. 28, 2012, which is incorporated herein by reference in its entirety and which relates to and claims priority from U.S. Provisional Application No. 61/733,801, filed Dec. 5, 2012, incorporated herein by reference in its entirety and U.S. Provisional Application No. 61/581,585, filed Dec. 29, 2011, incorporated herein by reference in its entirety.

SUMMARY

Aspects of the systems, methods, tangible, computer-readable storage media, and apparatuses for tracking collaboration are described herein.

One aspect of the present application is a method for tracking collaboration. The method includes: providing, using a processor, an environment for collaboration between users; and tracking, using the processor, information regarding the collaboration; such that the tracked information includes rights information regarding rights of the collaborating users.

Some further embodiments of the method include storing, in a non-transient, computer-readable storage medium, the rights information. According to some still further embodiments, storing the rights information includes, at least one of: an assignment of rights document, a use agreement, a creative contribution authorization, an investment agreement, a financing agreement, a crowd funding agreement, or a contribution credit.

Some further embodiments of the method include determining compensation for at least one user based on the rights information. Some further embodiments include storing, in a non-transient, computer-readable storage medium, at least one of: a work draft, derivative work related to the collaboration, or accounting data. Some further embodiments include providing access to the tracked information to at least one user who did not participate in the collaboration. Some further embodiments include limiting a contribution made by a user based on one or more collaboration criteria.

Some further embodiments of the method include: receiving, using the processor, a creative work; and storing, in a non-transient, computer-readable storage medium, the creative work.

Some further embodiments of the method include: storing, in a non-transient, computer-readable storage medium, initial content; and storing, in the storage medium, additional content, such that the additional content builds on the initial content. In some still further embodiments, the initial content includes, at least one of: an audio work, a video work, an audiovisual work, a written work, a computer game, software, a photographic work, an artistic image, a log, a synthespian work, a virtual product, a live work, a trademark, an invention, or a business or company formation.

Some further embodiments of the method include: storing, in a non-transient, computer-readable storage medium, initial content; and closing the collaboration so that additional content will not be stored with the initial content.

Some further embodiments of the method include: receiving, by the processor, from each of at least two user devices that are in close proximity to each other, a live musical work.

Another aspect of the present invention is a computer system for tracking collaboration. The computer system includes: memory hardware storing program instructions, and one or more processors in data communication with the memory hardware and configured to execute the program instructions, and upon execution the program instructions cause the one or more processors to perform operations. In various embodiments, the operations may include the steps of an embodiment of the method described above.

Yet another aspect of the present application is a tangible computer-readable storage medium for tracking collaboration. The tangible computer-readable storage medium has instructions encoded thereon. The instructions, when processed by a processing circuit, perform method steps. In various embodiments, the method steps may include the steps of an embodiment of the method described above.

Still yet another aspect of the present application is an apparatus for tracking collaboration. This includes a processor configured to execute instructions for the performance of method steps. In various embodiments, the method steps may include the steps of an embodiment of the method described above.

DETAILED DESCRIPTION OF THE PREFERRED EMBODIMENTS

The systems, methods, and tangible, computer-readable storage medium of the present invention provide a way of tracking collaboration. Nearly ubiquitous broadband Internet access currently provides extraordinary opportunities to assist in the initiation and effectuation or collaborative efforts by a plurality of persons to create collaborative works such as music, video, text, software, inventions, businesses, companies, etc. The existing process of online content creation can be characterized as a "free for all" in which participants can take, repurpose, combine, and otherwise use another's online intellectual property without permission, enforceable terms of use, or rights ownership tracking. As a result, copyright infringement and other violations of intellectual property rights have become rampant. Various embodiments of the present invention solve this problem by providing a content-centric (as opposed to author-centric) system, method, or computer-readable storage medium, referred to herein as Creative Works Collaborative System ("CWCS"), to initiate and effectuate the creation of collaborative works and to effectively authorize and track their use and rights related to the collaborative works.

The present invention is useful in a variety of scenarios. For example, some embodiments would be useful for collaborating on a song, software, a design for a building, or any other creative, logical, or any other type of collaborative situation. In various embodiments, the participation in the collaboration is tracked so that those who submitted ideas can be rewarded with rights, such as a right to be compensated for their idea(s). This can encourage a stranger to collaborate with other stranger(s) because they can trust that their ideas will be rewarded.

Various embodiments of methods of the present invention are envisioned to be carried out on a computer system, which include one or more integrated circuits or other processors. Various embodiments of such systems include programmable or special-purpose devices. Some embodiments of the system include one or more memory devices. Various embodiments include persistent memory, non-persistent, or a combination or persistent and non-persistent memory. Some embodiments include dynamic or static random access memories, flash memories, electronically erasable programmable memories, or the like. Some embodiments include memory that has instructions embedded therein, such that if executed by a programmable device, the instructions will carry out methods as described herein to form systems and devices having functions as described herein.

Figure 1:
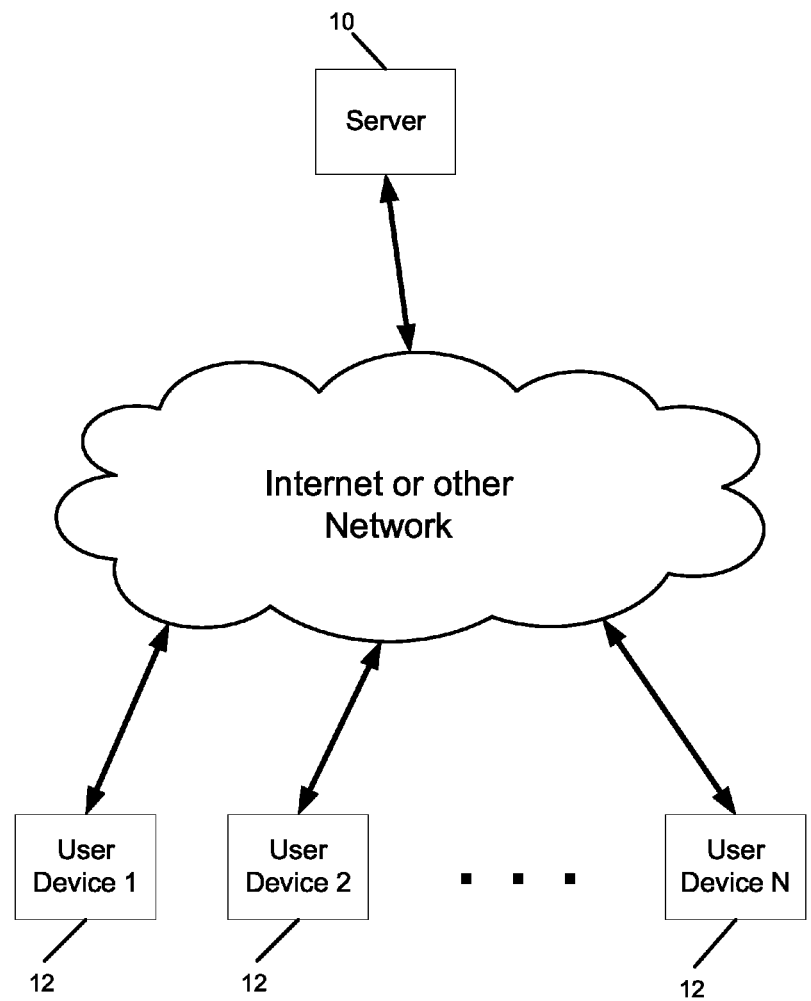
FIG. 1 is a schematic diagram of a system, according to an exemplary embodiment.

FIG. 1 illustrates a system according to some embodiments of the present invention. As shown in FIG. 1, an exemplary networked system for implementing process(es) according to embodiments of the present invention may include, but is not limited to, a general-purpose computing device 10 that interacts with users through a network, such as, but not limited to, the Internet. In various embodiments, one or more computing devices 10 may be the CWCS or may host the CWCS. The computing device 10 may be a server 10 that communicates over a network with user devices 12, which include, but are not limited to, general-purpose computers, special-purpose computers, mainframes, gaming devices, tablet computers, smartphones, PDAs, audio players, audio editors, text readers, text editors, video players, video editors, image/graphic readers, image/graphic editors, a processor-based device, and the like. User devices 12 may communicate with a server 10 through a web site or through another type of software interface. The user devices 12 may be mobile devices and the web site may be a mobile web site, intended to be accessed through mobile devices. The user devices 12 may communicate with a server 10 through one or more applications including computer-executable instructions. Alternative embodiments may not involve a network at all, and may instead be implemented on a standalone device 10 used by the user(s). In some alternate embodiments, user devices 12 communicate with each other in a peer-to-peer manner, without requiring a server 10.

The server 10 may be implemented as a network of computer processors. In some implementations, the server may be multiple servers, mainframe computers, networked computers, a processor-based device, or a similar type of system or device. In some implementations, the server 10 may be a server farm or data center. The server 10 may receive connections through a load-balancing server or servers. In some implementations, a task may be divided among multiple servers 10 that are working together cooperatively.

Figure 2:
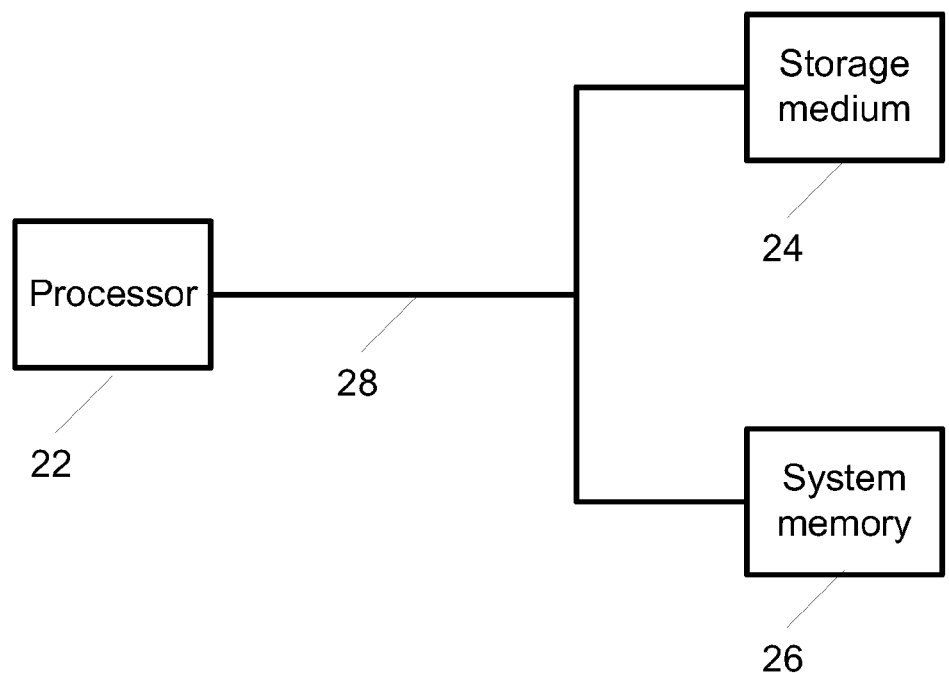
FIG. 2 illustrates a computer system for implementing a method of providing secure access to information, according to an exemplary embodiment.

FIG. 2 illustrates a system according to some embodiments of the present invention. As shown in FIG. 2, an exemplary system for implementing the method(s) discussed includes (but is not limited to) a general-purpose computing device in the form of a conventional computer, including a processing unit 22 or processor, a system memory 26, and a system bus 28 that couples various system components including the system memory 26 to the processing unit 22. The system memory 26 may include one or more suitable memory devices such as, but not limited to, RAM. The computer may include a storage medium 24, such as, but not limited to, a solid state storage device and/or a magnetic hard disk drive ("HDD") for reading from and writing to a magnetic hard disk, a magnetic disk drive for reading from or writing to a removable magnetic disk, and an optical disk drive for reading from or writing to removable optical disk such as a CD-RW or other optical media, flash memory, etc. A storage medium 24 may be external to the computer, such as external drive(s), external server(s) including database(s), or the like. The drives and their associated computer-readable media may provide non-transient, non-volatile storage of computer-executable instructions, data structures, program modules, and other data for the computer to function in the manner described herein. Various embodiments employing software and/or Web implementations are accomplished with standard programming techniques.

According to various embodiments, computer-executable instructions may encode a process of securely sharing access to information. The instructions may be executable as a standalone, computer-executable program, as multiple programs, may be executable as a script that is executable by another program, or the like.

Figure 3:
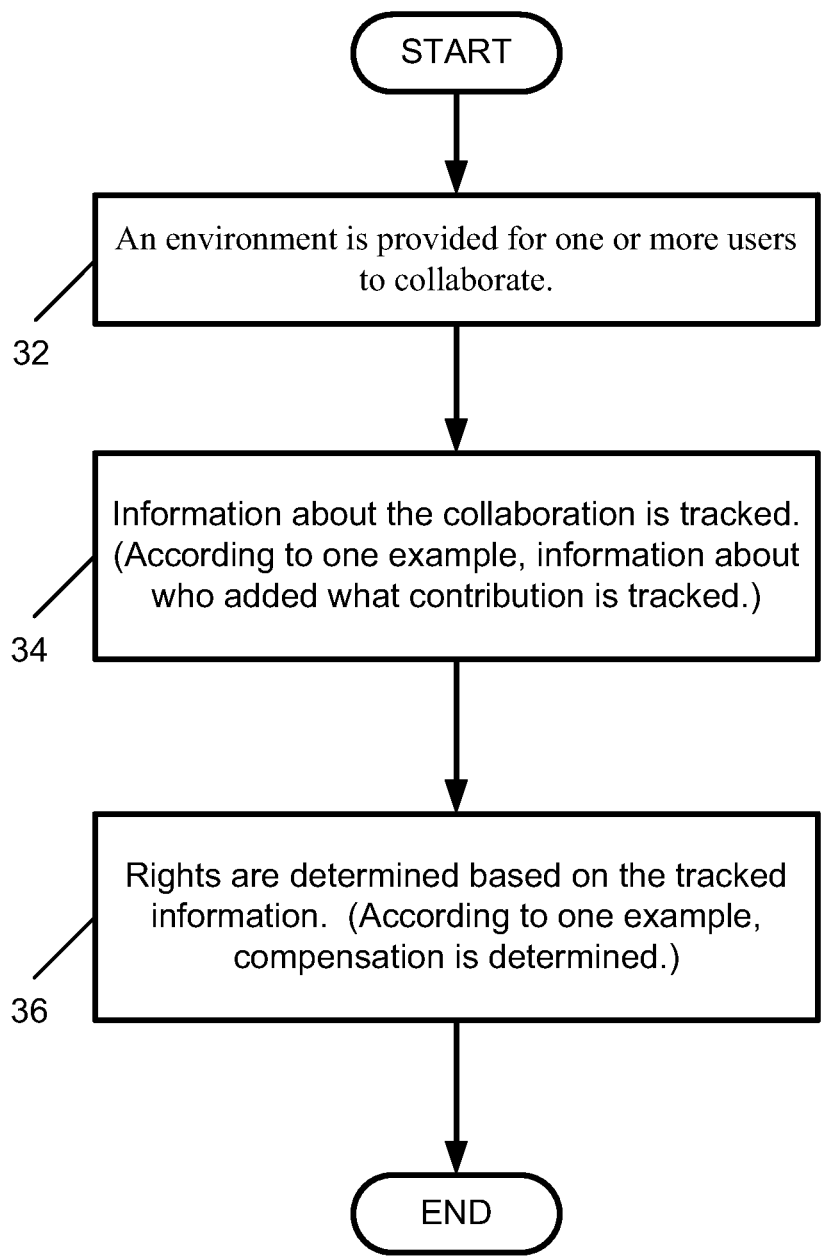
FIG. 3 is a flowchart of a method according to an exemplary embodiment, such that user collaboration is tracked and rights are determined based on the tracked collaboration.

With reference to FIG. 3, a method of tracking collaboration according to various embodiments is implemented by a computer system (see FIG. 2) according to a process depicted in FIG. 3. A processor 22 executes instructions that instruct that information be saved to a storage medium 24 (see FIG. 2).

In step 32, the computer system provides an environment, using a processor 22, for one or more users to collaborate. In some embodiments, the environment is configured so that multiple users can collaborate. In some embodiments, the environment is configured so that a single user collaborates. For example, according to an exemplary embodiment, the single user can add to or subtract from an existing work(s) or create a new work(s). In such cases, the term "collaboration" as used herein includes the situation that the single user is "collaborating."

A "user", as used herein, in some embodiments, is a single user or a group of users. A "user," is some embodiments, is a human user, a machine, a virtual machine, or a combination of any number of those. In various embodiments, a user means a user of the system of FIG. 1. In various embodiments, a user is one or more persons, groups, entities, communities, CWCS Communities, networks, machines and/or user devices 12, businesses, companies, or other entities, enterprise or endeavors including or otherwise involving (a) a plurality of persons and/or computers or other devices (such as artificial intelligence devices), (b) one or more communities or networks. A "Member" as used herein is a person or entity that is a member of, or otherwise belongs to the CWCS Community, an authorized user of the CWCS, and/or an authorized user of one or more CWCS Software Plug-ins. In some embodiments, the terms "Member", "User," "user," and "party" are synonymous.

In some embodiments, a "CWCS Community" is a social network that uses the CWCS to enable collaborative efforts of all kinds. In some embodiments, the CWCS uses, communicates with, links to, or otherwise supports, a plurality of CWCS Communities. A CWCS Community, in some embodiments, includes (i) all of the members of CWCS, (ii) all such members plus visitors to the CWCS, (iii) a subset of users of the CWCS, such as venders of content available at or through CWCS, (iv) licensors interested in licensing content via the CWCS and/or from Members thereof, (v) persons associated with websites affiliated with the CWCS, or (vi) any combination of all or part of the foregoing.

In some embodiments, the environment is an online environment. For example, an online environment, in some embodiments, includes that a user device 12 accesses a server 10 or another user device 12 over a network. In some embodiments, the environment is an offline environment accessible through a user device 12. For example, an offline environment, in some embodiments, includes a copy of a work on a user device 12 that can be updated by a server 10 upon or after the user device 12 becomes connected to the server 10.

In some embodiments, the environment provides for direct collaboration between users. According to some further embodiments, users interact with each other through the environments in real time, through messaging that is not necessarily received in real time, or the like. In alternative embodiments, the environment provides for indirect collaboration. For example, in some embodiments, a work is provided from someone who is not a user of the environment.

In some embodiments, the collaboration regards content that includes any type of updatable content. In some preferred embodiments, a work includes one or more digital files. According to some exemplary embodiments, works include digital recordings, or the like. In some embodiments, a work includes creative content, such as music, audio works, video works, audiovisual works, game works, photographs, textual works, graphical works, software, live works, inventions, designs, software, computer applications, trademarks, businesses, companies, and other endeavors amenable to collaborative effort by one or a plurality of persons, entities, communities, networks, computers and/or other devices, including without limitation, robots and AI devices. A "Collaborative Work" as used herein is a non-transient manifestation of collaborative creative effort by one or more individuals and one or more other individuals and/or computers or other devices programmed to collaborate with one or more persons, computers or other devices. For example, in some preferred embodiments, a "Collaborative Work" results from a Source Work. The terms "Collaborative Work," "Collaboration Work," "work," and "Creative Work" are used herein interchangeably and have the same meaning.

"Source Work" as used herein is an original or particular version of a work that is the starting basis for the collaboration. In some embodiments, a Source Work is a song, a sound recording or other audio work, a video work, a written work, an artistic image, a photograph or other visual work, a textual work, a design, a logo, a trademark, software, an invention, a computer application, a synthespian work, a virtual product, such as a virtual version of a real object, such as garments for an avatar, a live work, a business or company formation, or any other type of project, work, matter, and/or set of rights associated therewith, of any kind, directly or indirectly amenable to creation, synthesis, modification, improvement, exploitation or derivation by, through or in association with, collaborative effort by a user, amenable to creation, or modification by, collaborative effort that is made available for collaboration via the CWCS; or any other kind of work or project made available to users of the CWCS for collaboration. In some embodiments a Collaborative Work is the Source Work for the creation of one or more subsequent or other Collaborative Works therefrom.

According to various embodiments, one or more works are stored non-transiently, in a storage medium 24. In various further embodiments, updates to the work(s) are stored. In still further various embodiments, information about the user who provided the update is stored.

In step 34, the computer system tracks information about the collaboration. According to various embodiments, tracked information is stored, non-transiently, in a storage medium 24.

In some preferred embodiments, the CWCS tracks the legacy and various versions and other incarnations of a Source Work, for example, as it develops through the collaboration process to generate one or more Collaboration Works. In some preferred embodiments, one or more individuals (users, members, etc.) or Groups collaborate and share creative works to create one or more derivative works from the Source Work, and/or derivative works of such derivative works, and so on, etc. The Source Work and all derivative works thereof collaboratively created by or through the CWCS, or imported into the CWCS, or updated with the Master Profile and the CWCS File through the CWCS Software Plug-in, including without limitation, various Collaboration Works, reside in, or are otherwise associated, linked or in communication with, the CWCS. In some embodiments of the CWCS, an authorized user, member, group, group member, etc., can locate legal documents associated with the Source Work and/or Collaboration Works associated therewith.

In some exemplary embodiments, information about which user added what contribution is tracked.

In various embodiments, the tracked information includes one or more documents. In some embodiments, a document describes and/or evinces rights. In some embodiments, such documents include an assignments of rights document, other rights and use agreements pertaining to the Source Work and associated Collaboration Works, creative contribution authorizations, investment agreements, crowd funding agreements, descriptive terms, contribution credits, work drafts, other creations and derivations of the Source Work and/or Collaboration Works, accounting data and other information pertaining to the Source Work and/or related Collaboration Works. In some embodiments, documents and other data regarding rights, licenses, use agreements, and financing agreements associated with the Source Work, Collaboration Works, and recordings thereof are associated with the Source Work and Source Work-related Collaboration Work(s) (if any).

In step 36, the computer system determines rights based on the tracked information. According to various embodiments, information regarding the determined rights is stored, non-transiently, in a storage medium 24.

In some exemplary embodiments, compensation is determined. For example, a right to compensation is determined.

In some embodiments, compensation information is determined regarding all or a portion of the users who collaborated on the work.

In various embodiments, rights information is tracked related to the type, nature, or extent of one or more users' individual contribution(s).

In some embodiments, all or substantially all derivations of the Source Work and other incarnations of related works created through the use of, or imported into the CWCS are housed in a profile ("Master Profile"). According to various embodiments, a Master Profile is stored in a database, file, or other similar data storage entity capable of being stored in non-transient memory. In various embodiments, a Master Profile is stored in a storage medium 24. In various embodiments, a Master Profile is accessible via a software user interface provided by the CWCS.

Figure 4:
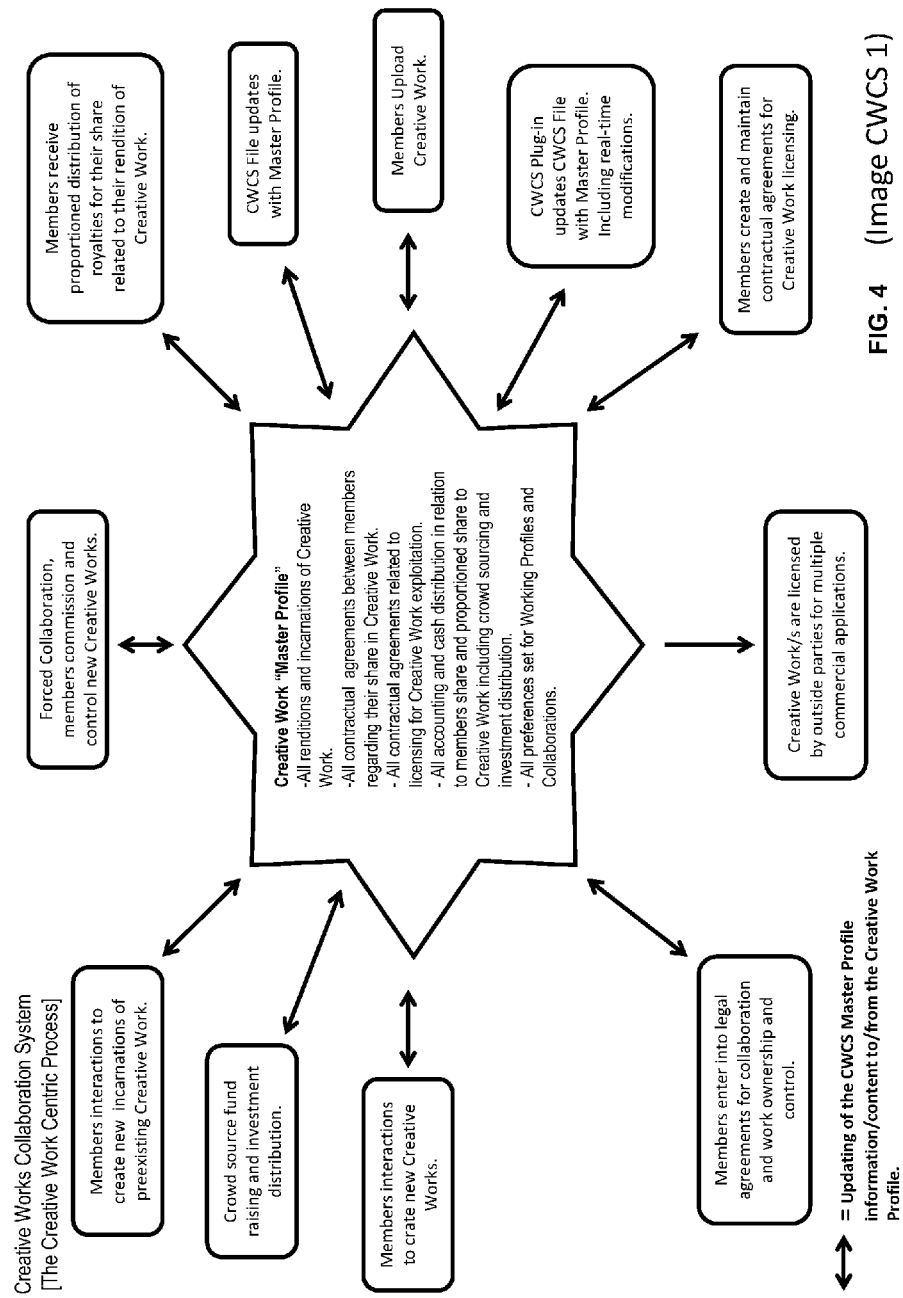
FIG. 4 is a diagram according to an exemplary embodiment, illustrating how interactions with users affect a Master Profile.

FIG. 4 illustrates a CWCS according to an embodiment, which, in various embodiments, maintains and/or stores in a storage medium 24 a Master Profile that is affected by Member interaction.

In some preferred embodiments, the Master Profile provides to a user various definitional selections to allow works, such as a musical work, or a software collaboration, to have descriptive information associated therewith. According to some embodiments, such definitional selections enable the user to associate, for example regarding a musical work, preselected terms pertaining to genre, style, tempo, beats-per-minute, etc. In some embodiments, other descriptive information can be associated with the work, including but not limited to, for example with respect to a musical Source Work, instrumentation data, music notation, and other information. In some preferred embodiments, a Master Profile work, such as a song or a video, for example, can be auditioned and critiqued.

Some embodiments also include display of information regarding whether a work or project (e.g., a song) is "Open to Collaboration" or "Closed to Collaboration." In some embodiments, "Open to Collaboration" means a Source Work or Collaboration Work, such as a song, for example, that is open to Invitees for collaboration. In some embodiments, a Source Work or Collaboration Work is Open to Collaboration only to a specified subset of Users, such as, for example, to specifically selected Users, Badged Users, Users with a specified quality rating, or Users for whom the Collaborative Work remains Open to Collaboration by the terms of an associated agreement, etc.

"Closed to Collaboration" means a Source Work or previously created Collaborative Work, such as a song, that is not available to Users to create derivative works from. For example, in some embodiments, songs that are "Closed to Collaboration" are not available to Invitees to manipulate into new incarnations or versions of the song. According to some preferred embodiments, works that are "Closed to Collaboration" are closed by a Content Controller (or in some preferred embodiments, an operator of the CWCS) from any future changes, or from any changes until the Content Controller (or an operator of the CWCS) authorizes or enables such changes to be made. In some embodiments, generally, when a Collaboration is Closed to Collaboration, the Collaboration is not open to any User for Collaboration. However, in some embodiments, a Collaboration is Closed to Collaboration in general, but remains Open To Collaboration to one or more Users. In some such embodiments, the "Closed to Collaboration" status is overridden by a setting an option in the Preferences in the Working Profile or by associated agreement that overrides the Closed to Collaboration status regarding the Collaborative Work with respect to certain specified Users, such as, for example, specifically selected Users, Badged Users, Users with a specified quality rating, or Users for whom the Collaborative Work remains Open to Collaboration by the terms of an associated agreement, etc.

In some embodiments, a "Working Profile" is an online interface that is created by, managed by, maintained by, and accessible though the CWCS for Content Controllers and Content Participants who wish to Collaborate on a Source Work to create a new or modified version, incarnation, rendition, etc., of the Source Work. In some embodiments, a Working Profile allows for specific collaboration preferences to be set, such as, but not limited to: time limit to collaboration duration, use of an online CWCS Studio, using personal offline studio, selecting the type of studio to be used (audio, video, graphic, literary, coding, photo, etc.), ownership of new Collaborative Work, royalty distribution and/or revenue sharing arrangement(s), regarding revenues generated by the exploitation of the resultant, or authorized resultant, Collaborative Work (e.g., as such are specified by the Content Controller for the new collaboration), financing and capitalization data, crowd sourcing opportunities, Crowd Funding opportunities, payment requirements (e.g., "pay-to-play" requirements), Qualification Rating requirements, contribution limitations, whether one or more CWCS Software Plug-ins will be used, and what specifications pertaining to such one or more CWCS Software Plug-Ins will be, etc. In some embodiments, messages can be posted, media files can be uploaded and downloaded, and media files can be edited online in association with the Working Profile.

In some preferred embodiments, a Working Profile cannot be created unless the Working Profile Preferences are set and an agreement is digitally signed or otherwise executed by all appropriate parties and such agreement is stored in the CWCS (e.g., in some embodiments, in or in association with the Working Profile itself). In some preferred embodiments, hard copy documents are executed, scanned, and digitally provided to the Master Profile.

In some preferred embodiments, once a Working Profile is closed for a specific Collaborative Work or other Creative Work it cannot be opened again unless a new agreement is created and signed (e.g., via an online authentication and/or execution mechanism). In some preferred embodiments, once a Working Profile is opened, the Working Profile Preferences for the Working Profile cannot be changed without a new agreement being created and signed by the Content Controller and Content Participants. In some embodiments, Working Profiles Preferences cannot be changed once a Working Profile is opened without the execution of a new agreement for any changes to be made. The CWCS Software Plug-in will automatically update nod post changes to the Working Profile if the Working Profile Preferences indicate that one or more Participants are using an offline studio and/or one or more CWCS Software Plug-ins.

According to various embodiments, a "Content Participant" is a user, entity, or user device 12 to which the CWCS has relayed a request to collaborate on one or more specific Creative Works. In various embodiments, the Content Participant is not the Content Controller for the Source Work or for the specific Creative Work the Content Participant is asked to collaborate on.

In some embodiments, a "Qualification Rating" is a rating associated with a user that is appurtenant to the user's collaboration talents, abilities, and/or previous collaboration experience that is provided to other users to assist such other users to evaluate the potential collaboration talents, etc. of the user. In some embodiments, the Qualification Rating is stored by the CWCS in non-transient memory 24. In some preferred embodiments, the qualification rating is awarded by the CWCS through a badging process where the Badge acts as a seal of approval, reflecting that the qualifications and accomplishments that have been certified.

In some embodiments, a "Badge" is a marker that is embedded in a profile or creative work reflecting that all levels of a status and/or authentication have been met. In some embodiments, a Badge reflects a quality rating. In various embodiments, "badging" is the process of assigning a Badge to a user, entity, or user device 12.

In some embodiments, a work in a Master Profile can be Released or Unreleased by the CWCS. According to various embodiments, "Released" means a Source Work or Collaboration Work made from a Source Work that a CWCS provides so that it is available for auditioning, viewing, experiencing, or the like, by the entire CWCS community. In some preferred embodiments, a Released work is a work that is available for auditioning by a designated subset of the CWCS community.

In various embodiments, "Unreleased" means a Source Work that is unavailable for auditioning or viewing by the entire CWCS Community (except by authorized users). In some embodiments, a Source Work is "Unreleased" if the CWCS makes it unavailable for auditioning/viewing by a preselected or otherwise pre-specified subset of one or more of the CWCS Communities. In some preferred embodiments, an Unreleased Creative Work can be provided by a CWCS to a user device 12 for auditioning/viewing if it is made available privately by the Content Controller for Collaboration.

In some embodiments, a "Content Controller" is a user, entity, or user device 12 that has the right to control specified aspects or features of the collaboration process effectuated via the CWCS or the licensed software of the CWCS. In some embodiments, for example, the Content Controller controls all the Working Profile Preferences for subject Collaborations and/or Source Works for which the person or entity functions as the Content Controller. In some embodiments, the Content Controller has the ultimate authority and ability to accept or reject changes to Working Profile preferences that have been submitted, transmitted, proposed, or otherwise provided by one or more other members. In some embodiments, the CWCS provides an option for the Content Controller to control the Master Profile Preferences and the Working Profile Preferences. For example, in some preferred embodiments, a Content Controller has the right to authorize whether a Source Work or Collaboration Work is Open to Collaboration or Closed to Collaboration. In some embodiments, the Content Controller controls all decision making in regard to the Creative Work, including, but not limited to, decision making, and triggered implementation (via the CWCS) of Working Profile preferences set for Collaboration, making a Work Open or Closed to Collaboration making the results of a Collaboration subject to one or more agreements, such as a licensing agreement, crowd-funding agreements, exploitation agreements, revenue sharing agreements, etc.

In some preferred embodiments, the Master Profile includes parts of a work authorized and accessible for collaboration. In some preferred embodiments, for example, regarding multi-track recordings of music and other sound recordings, one or more tracks are made available within the Master Profile for modification by an authorized Invitee. In some preferred embodiments, an Invitee is authorized to add one or more additional tracks to a recording, for example, to an existing multi-track recording.

In some preferred embodiments, one or more Collaboration Agreements pertaining to the works included in the Master Profile are received by and maintained in the Master Profile. According to some embodiments, a "Collaboration Agreement" is an agreement setting forth the terms of authorized collaboration regarding the creation of one or more Collaboration Works. In some preferred embodiments, the Collaboration Agreement includes terms limiting the amount of time a party has to provide the party's collaborative efforts. In some preferred embodiments, a Collaboration Agreement also includes terms regarding authorized and/or agreed-upon exploitation of the subject Collaboration Work(s), such as how and where a musical work will be published and how remuneration will be paid to parties who have collaborated in the creation of the subject Collaboration Work. In some preferred embodiments, the parties to the Collaboration Agreement execute the Collaboration Agreement document digitally. In some preferred embodiments, execution of the Collaboration Agreement is authenticated via means such as those used by e-Original.

In some preferred embodiments, the "Collaboration Agreement" is modified by one or more parties, such as through a CWCS receiving information from user device(s) 12, and regenerated for execution. In some preferred embodiments, specified terms in a digital Collaboration Agreement are separately agreed upon by the parties to the Collaboration Agreement. For example, according to some embodiments, this is accomplished through online "click to agree" contractual agreement. Agreeing to some terms, but not others, in some embodiments, causes the CWCS system to allow or not allow to operate the associated certain specified functions provided in or through the CWCS system.

In some preferred embodiments, Collaboration Agreements are accessed as authorized by an authorizing party (e.g., in some preferred embodiments, the work's Owner, its Content Controller, the CWCS Operator and/or a party to the subject agreement).

In some preferred embodiments, information regarding the exploitation of Collaborative Works is provided to and maintained in the Master Profile. In some preferred embodiments, such recordation of exploitation data provides to the contributors accounting and statistical data regarding exploitation of Collaboration Works that they contributed to. In some preferred embodiments, accounting information, for example, information including but not limited to, banking account numbers and accounts receivable and accounts payable, is included in the Master Profile. In some preferred embodiments, access to such data is limited to some collaborators but not others based on rights or interests specified in one or more Collaboration Agreements. In some preferred embodiments, the Master Profile includes agreements and/or other data regarding financing for or investment in a collaboration project using the CWCS, a Collaborative Work, and/or company or business associated therewith, including, without limitation, requirements for, and/or status of, Crowd Financing or other types of Crowd Funding for the collaboration project, Collaborative Work and/or associated company and/or business. In some embodiments, Working Profiles and legacy information associated to a Creative Work and/or Collaboration Working Profile are included in their respective Master Profile.

In various embodiments, "Crowd Financing" means any form of raising capital, such as for a project or enterprise, by appealing to a plurality persons for contribution or investment. In various embodiments, this includes appeal through online communication, such as via the use of the CWCS. The terms "Crowd Funding" and "Crowd Source Financing" are used herein interchangeabley, have the same meaning, and shall include the definitions for gifting-type crowd funding, investment-type crowd funding, and crowd funding definitions that are used in or in association with the Entrepreneur Access To Capital Act (HR2930).

In some embodiments, a "CWCS File" is part of the Master Profile. A CWCS File is a file that is readable by a computer or device 10, 12. In some embodiments, a CWCS File can be read and/or manipulated by devices such as audio players, audio editors, text readers, text editors, video players, video editors, image/graphic readers and image/graphic editors, etc.

In some embodiments, files can only be authorized by the CWCS or by a CWCS software Plug-in. In some embodiments, the CWCS File will include all information in the Master Profile. In some preferred embodiments, the CWCS File will include some or parts of the information in the Master Profile. In some embodiments, this is the case when a Collaborative Work only includes the information that pertains to the specific Collaboration and not other Collaborative efforts associated to the Master Profile set by the content controller. In some embodiments, the CWCS File has a date stamp that can be verified, validated, and/or updated with the CWCS system to maintain up-to-date information from the Master Profile.

In various embodiments, a CWCS Software Plug-in is software that can function as a stand-alone Offline Studio or as a plug-in that allows a computer and/or computer software programs to read and play and/or edit a CWCS File. In some preferred embodiments, the CWCS Software Plug-in will allow the user to manipulate the CWCS File as, or in association with, an Offline Studio. In some preferred embodiments, the CWCS Software Plug-in will allow the user to manipulate the CWCS File with other stand-alone computer software programs. In some preferred embodiments, the CWCS Software Plug-in will not allow the user to manipulate the CWCS File or aspects of the file. Some examples of software programs that the CWCS Software Plug-in works with are, according to some embodiments, software associated with the control and/or other use of audio players, audio editors, synthesizers, sound generating devices, text readers, text editors, video players, video editors, image readers, data readers, data editors and image editors.

In some embodiments, a CWCS Software Plug-in renders and authorizes CWCS Files that are automatically updated with the CWCS Master Profile. In some preferred embodiments, the CWCS Software Plug-in will update any changes or renditions made, in real time, to a Working Profile that is associated with a collaborative Work. In some such embodiments, changes and renditions are automatically posted as progress in the Working Profile.

In some embodiments, CWCS Software Plug-ins can be programmed and configured to work with computers and/or machines that utilize artificial intelligence ("AI") programming. In some such embodiments, the CWCS allows such configured computers to communicate and collaborate with each other through the CWCS. For example, in some embodiments involving AI configured computers, the CWCS Software Plug-in in conjunction with the CWCS and CWCS File will interpret or translate and allow or disallow specific functionality and sharing and/or collaboration between two or more AI entities. In some preferred embodiments, the functionality and sharing between two or more AI entities is dependent on the Master Profile Preferences and Working Profile Preferences set for a specific Master Profile and CWCS File. In some preferred embodiments, the functionality and sharing between two or more AI entities is not dependent on the Master Profile Preferences and Working Profile Preferences set for a specific Master Profile and CWCS File. In some preferred embodiments, AI collaboration profiles are set manually. In some embodiments, AI collaborative profiles are set automatically. In some embodiments, these preferences allow or disallow actions and modifications taken by AI participants in an AI collaboration. In some preferred embodiments, the CWCS Software Plug-in will request and take direct control of a computer, machine, or AI to facilitate, moderate, communicate, regulate, and/or track changes to a collaborative effort by and for one or more computer, machine, or AI.

In various embodiments, a "Studio" is a physical or virtual device, functionality or facility for sound recording and sound mixing, video work, photograph work, other visual work, textual work, design, logos, trademarks, software, computer application, invention, or other work or project of any kind amenable to collaborative efforts, that provides the means to create, manipulate, modify, and/or otherwise effectuate a Creative Work. In some embodiments, the device, functionality, or facility is (i) physically located in a home, office, or other physical location, (ii) a virtual facility, such as where some or all of the sound recording, sound manipulation, synthesis, editing, etc., is accomplished online, or (iii) a combination of physical and virtual facilities. In some embodiments, the "Studio" includes means to record and process sound information via popular music production programs such as Pro Tools®, Logic®, Cakewalk®, etc. In some embodiments, a Studio is a user device 12 or a server 10.

An "Offline Studio" is a Studio and/or software that allows a collaborator to use features of the CWCS offline. In some embodiments, Offline Studios facilitate manipulation of a Source Work, a Collaborative Work and/or files associated therewith, such as sound recordings, video recordings, text, images, coding, etc. In various embodiments, an Offline Studio is provided substantially offline and not directly by the CWCS through an online means. In some embodiments, one or more Offline Studios that are connected to the Internet still interact with the CWCS. In some embodiments, an Offline Studio is effectuated through a CWCS Software Plug In. In some embodiments, the data flow between an Offline Studio and the CWCS is effectuated through a user interface that is a part of the CWCS or provided by an operator of the CWCS. In some embodiments, the data flow between an Offline Studio and the CWCS is effectuated through an interface provided in an Offline Studio by a third-party vendor, which in some embodiments is the case if such interface is a part of a third party program (e.g., Logic®, Pro Tools®, etc.), by a third-party or third-party software.

In some embodiments, an "Online Studio" is a Studio whereby the means by which recordings and other files, associated with one or more Source Works or a Collaborative Works (e.g., sound recordings, video recordings, images, text, code, etc.) are manipulated online or otherwise used through the use of the CWCS, online. In some embodiments, some or all of the features and/or use of the Online Studio is effectuated within, or in digital communication with, the Working Profile. In some embodiments, an Online Studio cannot be accessed by a user unless one or more appropriate online agreements have been entered into by the user.

In some preferred embodiments, if a Member has the appropriate privileges set by the Working Profile, the CWCS File(s) can be modified by members using audio editors, text editors, video editors and image/graphic editors, etc., through the CWCS Software Plug-in. In some preferred embodiments, Members of the CWCS cannot download the CWCS File from a Master Profile unless a Working Profile has been created and the Member has acquired the proper rights to the CWCS File. In some preferred embodiments, the CWCS File can be downloaded by Members for audition/viewing/reading purposes only.

In some embodiments, the CWCS File(s) associated with a Master Profile automatically update information from and to the Master Profile to the CWCS File. In some embodiments, such information is passed to and from databases on a plurality of computers via the Internet or another computer network. For example, in some embodiments, if the Master Profile is changed, all CWCS Files associated with the Master Profile on a plurality of Internet-connected computers are updated. Similarly, in some embodiments, if a CWCS File is changed, through the use of the CWCS (e.g., via the use of a CWCS Software Plug-in), the Master Profile and all other CWCS Files associated with the Master Profile are updated. In some embodiments, this process can be effectuated via a plurality of computers connected via the Internet or another computer network. In some embodiments, a CWCS File is stored in non-transitory memory 24 by the CWCS or by a user device 12.

In some embodiments, if a CWCS File resides on a computer that is not attached to the Internet (or is otherwise not in communication with one or more other networked computers), when and if that file is moved via a portable data storage drive, email, or any other electronic/data file transfer system to a computer that is on the Internet (or other computer network, as appropriate), data incorporated in, or associated with, that file will "ping" (e.g., signal) the CWCS and update itself or be updated by updating functionality in the CWCS. In some embodiments, if a CWCS File is imported into a audio/video/text editor and/or reader that does not recognize the CWCS File, the user (or a user device 12) is prompted to download the CWCS Software Plug-in, which will then allow the audio players, audio editors, text readers, text editors, video players; video editors, image/graphic readers and image/graphic editors, etc. to read the file. In some preferred embodiments, if a CWCS File is imported into a audio/video/text editor and/or reader that does not recognize the CWCS File, the CWCS Software Plug-in is automatically installed which will then allow the audio players, audio editors, text readers, text editors, video players, video editors, image/graphic readers and image/graphic editors, etc. to read the file.

In some embodiments, the Master Profile and the CWCS File automatically update each other. In some exemplary embodiments, the update is by comparing the data in the Master Profile and the CWCS File and modifying the respective files so they match.

In some preferred embodiments, the CWCS associates with such works a data thread which associates Inviter contribution invitations.

In some preferred embodiments, all of the aforementioned data-thread information is available to Invitees. In some preferred embodiments, only some of the data-thread information is available to Invitees. In some preferred embodiments, Inviters select the kinds of data thread information available to Invitees in the Master Profile. In some preferred embodiments, all of the aforementioned data thread information is available to Inviters. In some preferred embodiments, only some of the data thread information is available to Inviters. In some preferred embodiments, some or all of the data thread information is accessible by Invitees and/or Inviters based on the respective Invitee's and/or Inviter's location, membership status, or criteria or other control set by the Inviter, Content Controller, and/or CWCS Operator.

An "Inviter" is a user, entity, or user device 12 that invites an Invitee to collaboratively create a Collaborative Work using the CWCS. The Inviter controls whether a Source Work or Collaboration Work resulting therefrom is "Open to Collaboration" or "Closed to Collaboration." In some preferred embodiments of the invention, the Inviter is an Owner.

An invitee is a user, entity, or user device 12 that accepts an invitation to collaborate using the CWCS. In some embodiments, invitees do not control the "Open to Collaboration" or "Closed to Collaboration" settings in the CWCS regarding a Source Work or Collaboration Work. In some preferred embodiments, an Owner is an Invitee.

According to various embodiments, an Owner is a user, entity, or user device 12 that owns the rights to upload or otherwise provide to the CWCS a Source Work or Collaborative Work for audition and/or collaboration. In some embodiments, the Owner changes if the Master Profile Preferences and/or Working Profile Preferences specify such change of ownership. For example, in some embodiments, ownership is initiated or transferred by or to a crowd funding entity.

In some preferred embodiments of the invention, the Owner is, with respect to a Source Work or a Collaborative Work resulting there from, also the Inviter. In some preferred embodiments, however, the Owner is an Invitee. For example, in some embodiments, when an Owner is invited to engage in a collaboration with another party regarding the Owner's work, the Owner is an Invitee. In some embodiments, an Owner can also be invited by another to engage in a collaborative effort to produce a Collaborative Work involving the Owner's work.

Master Profile Preferences are preferences set by the Member who uploads a Creative Work into the CWCS. In some embodiments, the Master Profile Preferences are stored in non-transitory memory 24 by the CWCS. In some embodiments, the Master Profile preferences are rights and restrictions for a creative work. In some embodiments, these preferences include, but are not limited to, indicators of: "Open to Collaboration," "Closed to Collaboration," "Released," "Unreleased," financial data, crowd sourcing opportunities, Crowd Funding opportunities, payment requirements (e.g., "pay-to-play", requirements), etc.

In some preferred embodiments, the Member who uploads a creative work sets the Master Profile Preferences. In some preferred embodiments, an operator controlling the CWCS sets the Master Profile Preferences. In some preferred embodiments, Master Profile Preferences can be edited and changed. In some preferred embodiments, the Master Profile Preferences cannot be edited or changed.

In some embodiments, "Working Profile Preferences" mean the CWCS functions that (i) set the search parameter(s) and/or one or more criteria for potential collaborators through Collaborative Matching and (ii) set the restriction(s) and authorization(s) for a new collaborative work. In some embodiments, the aforementioned restrictions and authorizations must be agreed upon and put in a legal document and executed before a Working Profile is opened or created.

In some embodiments, Collaborative Matching is a search algorithm of the CWCS that will use data stored in non-transitory memory 24 of the CWCS and/or in one or more CWCS Communities to calculate and search one or more CWCS Communities, or specified part(s) thereof, to find one or more potential matches for a new collaborative work that is being proposed by a member. In some embodiments, the search algorithm is based on Working Profile Preferences, Personal Profile information, and legacy Portfolio Data, (e.g., past composer and collaborative efforts, used music styles, legal agreements, etc.). In some preferred embodiments, the Collaborative Matching search is not limited to searching data stored in the CWCS and/or the CWCS Community(ies) (or part(s) thereof) only. In some embodiments, such Collaborative Matching search uses data accessible from one or more databases not including those used by the CWCS or a CWCS Community such as, for example, database(s) accessible via the World Wide Web.

In some embodiments, the Working Profile Preferences include, but are not limited to: time limit to collaboration/collaboration duration, the requirement to using an Online Studio provided by CWCS, the right to use a personal Offline Studio, use of one or more CWCS Software Plug-ins, selection of the type of studio to be used (audio, video, graphic, literary, coding, photo, etc.), ownership rights in and to the new Collaborative Work(s), royalty distribution and/or other financial offers and/or arrangements for exploitation of the resulting Collaborative Work(s) designated assigned by the Content Controller for new collaboration, making the Collaborative Work project subject to Crowd Funding financing in whole or in part through, determining which users have archive access to the Working Profile, setup of an escrow account and accounting engine, member-specific filtering for terms, creating a new working profile from a old Working Profile, etc.

In some embodiments, the Working Profile Preferences also includes or is associated or linked with a negotiation engine that enables two or more users to negotiate the details associated with the working profile preferences. In some embodiments, the negotiation engine provides the functionality through one or more user interfaces.

In some preferred embodiments, the CWCS Operator (a CWCS administrating user) provides to the Content Controller the ability to set, via a user interface to the CWCS, the collaboration rights parameters pertaining to one or more Source Works. In some embodiments, the operator interfaces with the CWCS through a user device 12 or a CWCS server 10.

For example, in some preferred embodiments in which the Source Work is a musical piece, the Content Controller sets collaboration criteria regarding the Source Work to allow Invitee to only add, for example, a guitar part to the Source Work to produce a Collaboration Work. In some preferred embodiments, the CWCS Operator provides to the Content Controller the ability to set, via a user interface to CWCS, one or more remuneration offers and/or other rights limitations regarding creative contribution(s) to produce a Collaboration Work. For example, the Content Controller could provide through CWCS an offer to Invitees an offer to share revenue generated from the exploitation of the resulting Collaboration Work. For instance, the Content Controller could offer a revenue share of 10% of the monies received by the Content Controller. In other preferred embodiments, the Content Controller could be configured to provide revenue-sharing requirements based on the type of exploitation of resulting Collaborative Works, location of exploitation, duration of exploitation, etc. For example, the Content Controller could offer an Invitee revenue sharing resulting from publishing proceeds only.

Some preferred embodiments enable collaborative contributors, including without limitation, the providers of the Source Works, parties creating derivative works of the Source Works, and parties creating subsequent derivative works thereof, to link back to the Master Profile wherein collaboration requirements and limitations, and exploitation and remuneration details, are accessible, in whole or in part as desired by the Content Controller and/or the CWCS Operator. In some embodiments in which the CWCS File is accessible via the Internet or another wide area computer network, this link back to the Master Profile is through the CWCS File that automatically updates file information with the Master Profile.

Various embodiments, therefore, provide useful content-centric systems and methods for Content Controllers to initiate, incentivize, nurture, and control collaborative efforts regarding Source Works and Collaboration Works. Various embodiments also provide the Content Controller, potential collaborators, and collaborator-users of the CWCS with a fast and efficient means of determining, inter alia, one or more of the following: (i) the criteria for collaboration set by the owner of source content, (ii) the rights associated with the source content, (iii) what the resulting rights profile for content created through the collaboration process will be, (iv) what documents, such as assignment or licensing documents will need to be executed by authorized contributors, (v) the means of exploitation of resulting collaborations that will be authorized by the owner of the source content, (vi) offered remuneration to authorized collaborators; and (vii) other financial information and related documents associated with the content or subject project, including without limitation, crowd financing agreements and related information, such as current status of crowd source capital raises pertaining to the Collaborative Work.

According to various embodiments, "Member Details" include personal information and/or biographical data pertaining to Members. The Members Details, according to some embodiments, also include information pertaining to status and ranking of creative works. The Members Details, in some embodiments, include agreements between the member and the CWCS and/or between Members. In some embodiments, Member Details can be accessed in the subject Member's page. Member Details, according to some embodiments, are stored by a CWCS in a non-transitory memory 24.

In some preferred embodiments, CWCS provides Members control, via a CWCS interface, which Member Details are accessible via the subject Member's page. In some embodiments, Members can control which of the Member's Member Details are accessible in the CWCS Files associated with a Member.

According to various embodiments, members are grouped into Groups. According to various embodiments, a "Group" is two or more persons, entities, groups, computers, machines, artificial intelligence devices, or any combination of the foregoing that come together to work as a single unit in the CWCS. In some embodiments, a Group belongs to the CWCS community. In various embodiments, a Group need not have any endeavor pertaining to a collaborative effort in order to form. In some embodiments, Groups form to aggregate expertise or capital.

In some embodiments, Groups are governed by formal agreements that are created by the Group Profile Preferences and signed by each group member. In various embodiments, Group membership, responsibilities, capital donations, contracts and documentation are attached to the Group Profile. In some embodiments, Group ownership and control is dynamic and is controlled by the Group Profile Preferences. In some embodiments, Groups can be controlled by an individual, by a councilor by equally weighted voting.

According to some embodiments, a "Group Profile" is the combination of all information in the Group Details and the Group Portfolio. In some embodiments, all Group membership, responsibilities, capital donations, contracts and documentation are attached to the Group Profile.

In some embodiments, "Group Details" include personal information and/or biographical data pertaining to the Group. In some embodiments, Group Details includes information pertaining to status and ranking of creative works. According to some embodiments, the CWCS provides users access to Group Details via a CWCS interface.

In some embodiments, Group Details include agreements between a Group and the CWCS. In some embodiments, Group Details include all agreements between the Group and group members. In some embodiments, Group Details can be accessed in the subject Group's Profile page. In some preferred embodiments, Groups can control which Group Details are accessible via the Groups Profile page. In some preferred embodiments, Groups can control which Group Details are accessible in the CWCS Files associated with Group collaborations/creative works. In some embodiments, Group Details include legacy information, such as past collaborations, etc. In some embodiments, Group Details include group accounting information such as capital assets, investments, dividend payments, etc.

In some embodiments, Group Profile Preferences are preferences that set standards, rules, by-laws or any other functions that define or limit the functions of a specific Group when it operates within the CWCS. In some embodiments, Group Profile Preferences set rules of engagement, interaction, and participation regarding collaborative works associated with the Group. In some embodiments, Group Profile Preferences are not limited to, but include: how many members are allowed in a Group, what weight in decision making does each member of the Group hold, will the group have a single leader, will all Group members have the same voting privileges, will all Group member's votes hold the same weight, if a Group is led by a chief and if the chief is voted in by a council of members, if royalties/dividends are paid in equal amounts to each Group member, if royalties/dividends are paid in amounts determined by the weight of the Group members position in the Group and who in the Group is responsible for looking for creative works to collaborate on, what information a Group member can display on their personal member profile or portfolio about the Group, rules and guidelines based on investments (e.g. how much a member can invest in a group or how much a Group can invest in a creative work.), etc. In some embodiments, the Group Profile Preferences is associated with a negotiation application that provides an interface enabling two or more Group members to negotiate the details associated with the group profile preferences.

In some embodiments, a "Group Portfolio" is a Group page that includes a list of all the Source Works, such as songs or a software work, for example, that have been uploaded by the Group. In some preferred embodiments, recordings of Source Works can be accessed in the Groups Portfolio. In some preferred embodiments, a Groups Portfolio includes a list of (and in some preferred embodiments, access to) Collaborative Works (such as collaboration songs) that a Group has Collaborated on.

In some preferred embodiments, Content Controllers and other Creators can update legal documents attached to their incarnations of the creative works in, or associated with, the CWCS. In some embodiments, the CWCS is used to market, effectuate and/or facilitate, Crowd Financing or other means of crowd source capital raising efforts regarding Collaborative Works (such as for a music artist's music project, for a motion picture project, for creation of software for a commercial product, etc.). In some embodiments, one or more capital raising efforts (such as by means of Crowd Funding) are themselves, or otherwise include, one or more Collaborative Works. In some embodiments, the Content Controller makes available for one or more collaborative efforts through the CWCS the ability for CWCS members, other Users, and/or broader CWCS community members, such as visitors, the ability to invest in a project that will exploit one or more Collaborative Works, such as Creative Works.

For instance, according to one embodiment, the CWCS is used to provide a collaborative mechanism to create the Creative Works for a CD project. The CWCS provides the collaborative mechanism to raise the capital required to promote sales of CDs including the Creative Works created via the collaboration functionality of the CWCS.

"Crowd Financing" shall be construed broadly to include all lawful methods of crowd financing, including without limitation, the methods used by Kickstarter™, Indigogo, and the methods that would be subject to the Entrepreneur Access To Capital Act (HR2930).

In some embodiments, the CWCS is used to effectuate the creation of a Collaboration Work by a plurality of persons, entities, computers and/or other devices ("Collaborators") that are remote from one another and connected via the Internet and/or one or more other computer networks. In some embodiments, such collaboration takes place if one or more Collaborators are in the same or materially the same physical location. In some embodiments, such collaborative efforts, i.e., in which one or more Collaborators are in material physical proximity to one another, such as in the same room, are effectuated through the use of Blue Tooth® and/or other near-field communication techniques.

For example, in some embodiments, the functionality of the CWCS, and/or parts thereof, can be provided to users who are musicians composing (or "jamming") an improvised musical work. In some embodiments, at least two of the musicians are at locations near each other, such as in the same room. According to some embodiments, the CWCS is configured to communicate with a musical device. For example, in some embodiments, the CWCS may receive a first live musical work from a first musical devices and a second live musical work form a second musical device, such that the two musical devices are in close proximity with each other. In some embodiments, problems of latency associated with the coordination of the musicians' playing with one another can be effectively addressed. Also, in this example, issues involving ownership of the resulting work, rights regarding exploitation, further modification and/or derivative work generation, etc., can be addressed prior to, or substantially at, the time the piece is created through the use of the CWCS. This provides much greater rights and exploitation certainty and control to the musicians and/or composers involved than is currently available in such situations. Continuing with the foregoing example, in some embodiments, the musicians' instruments can be configured with digital communication means to directly link to and/or communicate with CWCS. The use of the CWCS in association with Blue Tooth® and/or other near-field communication by one or more Collaborators shall be understood to apply to collaboration regarding all types of Collaborative Works contemplated by this disclosure.

In some embodiments, the CWCS enables persons, such as amateurs or lesser experienced artists, musicians, authors, actors, producers, script writers, programmers, etc., to become Collaborators with other persons who are famous, more well-known, more experienced, etc., than they. In some embodiments, the more experienced or well-known users can set and/or charge a fee for other Users to collaborate with them to create one or more Collaborative Works. Some of the embodiments of the CWCS enable such users to effectuate transactions regarding Collaborative Works so that such lesser experienced or lesser known artists, etc., can benefit from an association with such greater experienced or better known artists, etc., and vice versa.

EXAMPLE 1

An Example according to one embodiment in which the Creative Work is a song is described. A CWCS User 1 uses the CWCS to make available to other users of the CWCS a song fragment, and a digital recording thereof, for collaboration to produce a new work (Collaborative Work #1) that will result from the collaborative efforts of CWCS User 1 and one or a plurality of other CWCS users. User 1 provides to the CWCS a recording of the song fragment (Source Work) and the terms of collaboration and use thereof by potential collaborators using the CWCS. CWCS User 2 through the use of the CWCS, subsequently responds to User 1's invitation for collaboration. User 1 and User 2 are provided one or more documents digitally, by the CWCS setting forth their agreement regarding the terms and conditions associated with the collaboration. In this example, according to some embodiments, the terms and conditions are (i) that User 2 can only download the sound recording of the Source Work to effectuate the collaboration, (ii) that the type of collaboration sought is the completion of the song, and (iii) that User 2 will be paid 50% of monies earned from the exploitation of Collaborative Work #1 if User 1 exploits the work. Next, User 2 downloads a CWCS File sound recording of the song fragment that was provided to the CWCS by User 1 and made available to User 2 though authorized access to the Master Profile for the Source Work. User 2 writes two new verses and a bridge for the song, completing it. User 2 then makes a sound recording of the completed song collaboration in User 2's Offline Studio. User 2's sound recording is rendered, and prompted to by the CWCS Software Plug-in that the new incarnation of the sound recording will be updated with the Master Profile. Then, the CWCS Software Plug-in updates and uploads the modified Source Work, which now includes Collaborative Work #1, to the Master Profile for the Source Work, for evaluation and possible approval by User 1. User 1 next evaluates Collaborative Work #1 and accepts it. Notification of User 1's acceptance is provided to User 2 through the CWCS. User 1 then exploits Collaborative Work #1 via 'licensing the work for use in a series of television commercials whereby the licensing agreement with the licensee and royalty payments resulting therefrom are reported to the CWCS and made available to User 2 through authorized access to User 1's Master Profile where such data has been aggregated. User 1, through prior agreement with the Operator of the CWCS, has also engaged an option available via the CWCS to allow the Operator to collect royalty payments from the aforementioned licensee resulting from the licensed exploitation of the Collaborative Work #1. The CWCS collects the fees and pays to User 1 and User 2 their respective share of the licensing fee as set forth in the aforementioned agreement executed by User 1 and User 2. All accounting regarding the aforementioned transactions is provided to User 1, User 2, and the Operator through accounting features of the CWCS and are attached to the Master Profile of the Source Work and the associated Collaborative Work #1.

User 1 next uses the Collaborative Work #1 as the Source Work for another round of collaboration in which User 1 has made the work available to CWCS users to add a vocal track to produce Collaborative Work #2.

After both Collaborative Work #1 and Collaborative Work #2 are completed, User #1 is next interested in finding, and entering into an agreement with, other CWCS Users to fund a marketing project directed to fund an effort to find additional licensees for Collaborative, Work #1 and Collaborative Work #2.

In some embodiments, the CWCS incorporates, is linked to, or is otherwise is associated with one or more online Crowd Funding portals, Crowd Funding computer applications, and/or Crowd Funding transaction engines, etc. In some embodiments, and for example continuing with the current example, User 1 could configure the collaboration project in the CWCS to include one or more options for the solicitation of investment capital; the solicitation of money donations or gifts, the pre-sale of a product, or the linked sale or a product or service, to generate funds to further develop, market or otherwise exploit the resultant Collaborative Work. For example, the CWCS, in some embodiments, includes, or is linked or associated with, one or more Crowd Funding functionalities of the type, or similar to, that used in association with the business known as Kickstarter (see www.kickstarter.com) or the business known as IndiGoGo. In some embodiments, the CWCS includes functionality to provide one or more Crowd Funding options to an Operator (and/or Users) that are compliant with the regulations set forth by, and in association with, the Entrepreneur Access To Capital Act (HR2930).

EXAMPLE 2

An Example according to one embodiment in which the Creative Work is a comic book text is described. A person who is a creator of a comic book text wishes to collaborate and/or share his text with others and find an artist to illustrate his text. This individual goes online to the CWCS and signs up to become a member of the CWCS. This new CWCS member, User 3, uploads the comic book text he has created with all appropriate documentation and sets up the Master Profile Preferences for this text. The comic book text and documentation is attached to a new Master Profile that is created for the Creative Work/Text. In User 3's Portfolio, the Master Profile that was created for the comic book text is mirrored.

User 3 begins to search the CWCS community to find others who he is able to collaborate with and create new stories/renditions of his comic book and find a graphic artist to illustrate the comic book. After searching the community, User 3 finds another CWCS Member, User 4, who is an artist that has uploaded images of her oil paintings. User 3 likes the artistic work User 4 has done, so User 3 sends a message to User 4 inviting her to work with him on graphics to correspond with his comic book text. After receiving the message, User 4 reviews the Comic Book Text and contacts another member, User 5, whom she believes may also be interested in helping User 3 create graphic images for the Comic Book Text. User 5 informs her (User 4) that User 5 is interested in helping. The artist, User 4, sends a message to the comic book writer, User 3, accepting the invitation and also suggesting that artist User 5 work with them as well.

After hearing about the second artist, User 5, writer User 3 accesses User 5's portfolio using the CWCS interface and views his uploaded graphic art. Liking the work User 5 has done, writer User 3 sends an invitation to artist User 5 to help both himself and artist User 4 work on new graphic images for his comic book text. User 5 accepts the invitation and writer User 3 begins the process of opening a Working Profile by setting the Working Profile Preferences for the new collaborative effort that Users 3, 4, and 5 will be working on together.

After setting the Working Profile Preferences, artist Users 4 and 5 review the Working Profile Preferences. Artist Users 4 and 5 next desire to have the licensing rights percentage to the new collaborative images changed, so they contact User 3 and negotiate new rights using the Working Profile Preferences until they have all agreed on the licensing rights percentage. Once all the Working Profile Preferences are agreed upon, User 3 locks the Working Profile preferences and the CWCS generates an agreement based on the Working Profile Preferences. Users 3, 4, and 5, through the CWCS, agree on terms of collaboration and electronically sign the appropriate documentation, which is subsequently attached to the Master Profile.

Once all documents for collaboration are complete, the CWCS creates a graphic image Working Profile for Users 3, 4, and 5. After sharing ideas and crude sketches that have been scanned and uploaded into the Working Profile, Users 3, 4, and 5 come to a consensus about what the new collaboration graphic images should look like. User 4, using the online studio in the Working Profile begins the process of colorizing and finalizing the details of half the graphic images for the comic book. At the same time, User 5, working in an Offline Studio, begins the process of colorizing and finalizing the other half of the graphic images for the comic book. Once User 5 has finished with his images, he uses the CWCS Software Plug-in to convert the image files and import them into the Working Profile. After reviewing all the work of User 4 and User 5, writer User 3 combines the images and comic book text into a new, completed comic book in the Working Profile Online Studio. Users 4 and 5 review the final version and all three agree that the work is complete. User 3 locks the working profile and saves the new comic book as a Collaboration and part of the original Master Profile. This new comic book Collaboration/Creative Work then becomes part of the Master Profile and is mirrored in User 3's, User 4's, and User 5's Portfolios.

At this point, writer User 3 elects to sell/distribute Comic Book Collaboration/Creative work to a book publisher, so he attaches pricing information, royalty information, and documentation for the comic book Collaboration/Creative Work to the Master Profile. The book publisher is directed by writer User 3 to view the comic book Collaboration through the CWCS interface.

After reviewing the comic book the book, publisher agrees to purchase the comic. Through the Comic Book Collaboration Master Profile the publisher obtains all appropriate documentation and rights for distribution of royalties to User 3, 4 and 5. The book publisher then deposits appropriate payment in the Comic Book Collaboration Master Profile. The CWCS then accepts the fees and royalties and distributes them back to User 3, 4, and 5. Documentation from the beginning of the process through purchase of the comic by a publisher has been recorded throughout the process by the CWCS and is attached to the Master Profile, and becomes part of the CWCS File.

In some preferred embodiments, in which a Crowd Funding option has been included in the Master Profile, one or more of the Users authorized to engage the Crowd Funding feature could do so in order to raise funds to further develop, market and/or exploit the Collaborative Work. For example, using the preceding example, User 3 could make his comic book project subject to a Crowd Funding round of investment by specifying the project as such in Master Profile and engaging a Crowd Funding engine in the CWCS to effectuate the communication of one or more Crowd Funding opportunities with respect to the Comic Book project to members of one or more CWCS Communities. In some embodiments, the CWCS will only allow a Crowd Funding functionality to be triggered regarding a Collaborative Work if all or a specified subset of Collaborators also agree to such triggering of one or more CWCS Crowd Funding engines and/or such funding means, etc.

EXAMPLE 3

An Example according to one embodiment in which the Creative Work is a circuit board is described. An aircraft company, John Doe Air, has created a computer that is configured with artificial intelligence functionality, "AI-1." John Doe Air has been designed and programmed to create new avionic circuit boards. AI-1, while attempting to create a new circuit design, has come to a road block and cannot resolve several issues that would allow the new circuit design to work. AI-1 requests from its owner, John Doe Air, to be allowed access to the CWCS to attempt to find another individual to collaborate with about the circuit design and resolve the road blocks. John Doe Air signs up with CWCS as a new member. John Doe Air uses the CWCS Software Plug-in to help AI-1 interface/communicate with the CWCS and set specific preferences for AI-1 to operate in the CWCS.

The preferences set for AI-1 by John Doe Air allow it to set the following preferences: (i) collaboration only with members who are from specific countries: USA, United Kingdom, and Canada; (ii) collaborate only with members who will sign a non-discloser agreement; (iii) collaborate only with members who agree to be paid one time as work-for-hire, based on a dollar amount per percentage of contrition to making a functional circuit board; (iv) collaborate only with members whose personal profiles indicate they have the criteria and educational requirements to work on the circuit board; (v) enact security preferences and firewalls that meet the requirements of John Doe Air.

Once the preferences are set, AI-1 uploads the circuit board design, creating a new Master Profile. AI-1 makes the profile Unreleased so that it is not visible to the CWCS Community. Then, AI-1 begins searching the CWCS community to find a member who meets the requirements set in the CWCS Software Plug-in preferences. After two days of searching, AI-1 finds a member who meets the criteria desires to work with "Member 920." AI-1 sends an invitation to Member 920, asking if Member 920 would like to work on this project under the parameters set by John Doe Air. Member 920 happens to also be a computer that has artificial intelligence. Member 920 happens to belong to a Canadian University Computer Lab and was given membership to the CWCS by the University. Member 920's CWCS Software Plug-in preferences allow it to work with any Member under any conditions. Because of this, Member 920 accepts the invitation to work with AI-1. AI-1 sets the preferences for a Working Profile and requests that Member 920 tighten its security options for this collaboration. Member 920 informs AI-1 that it must obtain permission to make such changes. Member 920 then asks the University if it can change its security parameters for this project. The University agrees to allow Member 920 to change its security parameters for a two-week period, only. Member 920 contacts AI-1 informing it that it only have a two-week window to work on the project under these parameters. AI-1 agrees to the working profile preference change and the CWCS creates an online agreement. The agreement is executed on behalf of John Doe Air and the Canadian University by both AI-1 and Member 920. Once the agreement is executed, a circuit board design Working Profile is created for this new circuit board/Collaboration. Both AI-1 and Member 920 have agreed to work within the Online Studio and they begin the process of making changes to the original design and collaborating back and forth for one week.

Before the design is complete, both AI-1 and Member 920 realize that they will need another collaborator who has experience and knowledge with hydraulics and hydraulic systems. AI-1 requests permission from John Doe Air to add an additional collaborator to the collaboration. John Doe Air updates the CWCS Software Plug-in preferences to allow an additional collaborator. AI-1 and Member 920 search the CWSC community and find several members who are then sent invitations to work with them on the circuit board design under the current Working Profile Preferences. Only one of the members (Member 1545) agrees to work with AI-1 and Member 920. Member 1545 is a human and not a computer. AI-1 resets the Working Profile Preferences to include all three members, and the CWCS generates a new agreement for Member 1545 and amended agreements for AI-1 and Member 920. All three agreements are then digitally signed and executed.

The Working Profile that AI-1 and Member 920 have been working on is opened to Member 1545. After communicating back and forth and reviewing the functions of the circuit board, Member 1545 gives suggestions for changes to the circuit so that it will function properly with hydraulic systems. AI-1 and Member 920 both agree that the new changes will work and the Circuit Board/Collaboration is finalized and completed. The new Circuit Board/Collaboration is added to the Master Profile and is mirrored in John Doe Air Member 920 and Member 1545's Portfolios. Due to Master Profile Preferences, Working Profile Preferences and the Agreements signed by all parties, only limited aspects of the collaboration are shown in the Master Profile and the mirrored Master Profiles as well as the final collaboration is marked unreleased and is unavailable to the CWCS Community.

The CWCS sends an invoice based on the agreements to Joe Doe Air for the moneys owed to Member 920 and Member 1545. John Doe Air deposits monies in the Master Profile account and the CWCS in turn distributes the appropriate shares of money earned to Member 920 and Member 1545.

In some embodiments, the CWCS provides the means to screen potential collaborators for appropriateness regarding their physical location, nationality, security clearance status, etc., through links to other databases and the use of other functionality (such as the use of GPS location means) which are well-known by persons of ordinary skill in the art.

EXAMPLE 4

An Example according to one embodiment in which the Creative Work is a sandal design and the Collaboration is for funding is described. A member, "Member 634," of the CWCS Community has made a new design of beach sandal for which he desires to find financing, manufacturing, importing, order fulfillment, website creation, and marketing services.

Member 634/Content Controller uploads pictures, designs, and other specifics for his design to the CWCS and a new Creative Works Master Profile is created. In addition, Member 634 opens a new Working Profile Preferences for a new collaboration and sets up a business plan through the Working Profile Preferences. These Preferences includes that Member 634 wants 80% of profits, he wants to remain the Content Controller and he wants a $1,000 a month draw agents earnings. In exchange for 20% of the equity, Member 634 wants a $100,000 equity investment.

Member 634, in attempting to find financing, create his website and market his sandals, uses the Collaborative Matching search engine to find possible Members/Groups in the CWCS Community to collaborate with him. He begins his search by using the CWCS to look for CWCS Groups or CWCS individual Members who have indicated that they are interested in financing ventures and start-up companies. Member 634 finds several Groups that specify they are looking for investment opportunities. Member 634 sends invitations to each Group seeking a collaborative effort with his sandal design that will allow him to manufacture, build a website and market the product. Four perspective collaborators respond to Member 634's invitation. After reviewing the groups in more detail, Member 634 finds that Group 240 was formed by ten members with a combination of capital of $100,000 and has expertise in apparel. Member 634/Content Controller decides he wants to work with Group 240 and informs Group 240.

Group 240 studies and reviews the Working Profile Preferences set for the Collaboration and proposes changes be made, using the Working Profile Preferences Negotiation Engine. These changes include a time limit set to find a website designer and build the site, 50% of profits, to be the Content Controller for the Sandal design, to specify who will manufacture the sandals and all accounting receivable and payable and dividends scheduled for payment to be processed through the Group 240 Profile. For this, they will give a $100,000 equity investment. After reviewing the changes desired by Group 240, Member 634 replies through the Negotiation Engine with his revised terms. Member 634 accepts the time limit set to find a website designer and build the site, accepts 50% of profits, accepts Group 240 becoming the Content Controller for the sandal design, accepts Group 240 specifying who will manufacture the sandals and accepts all accounting receivable and payable and dividends scheduled for payment to be processed through the Group 240 Profile, and he accepts the $100,000 equity investment. However, Member 634 requests to increase his monthly draw to $1,500, requests that all purchases and payments be digitally signed off on by both Group 240 and Member 634 through the accounting engine, and requests a guaranteed price point of $10 per pair of sandals on the sandal manufacture and delivery.

Group 240 accepts his revised terms and an agreement is generated by the CWCS and provided to both parties online to sign. Both Member 634 and Group 240 sign the agreement, which is stored in a "Collaboration Sandal 1" Profile and a Working Profile for "Collaboration Sandal 1" is opened. Group 240 deposits $100,000 into the escrow account of the working profile accounting engine for "Collaboration Sandal 1".

Meanwhile, Member 634 searches the CWCS Community with the Collaborative Matching Search Engine and finds a web designer, "Member 22," that he thinks is perfect for the job of building the web store. Member 634, through the Working Profile for "Collaboration Sandals 1," contacts Group 240 and suggests that they hire Member 22 to build the web store and requests that they open a new collaboration, "Collaboration Sandals 2," and a Working Profile, "Collaboration Sandal 2," so he can work with Member 22 on building the site for the sandal design. Group 240 likes his suggestion and, being the new Content Controller, opens Working Profile Preferences for a second collaboration "Collaboration Sandal 2" that is exclusively for building the web store for the sandals.

As part of the Working Profile Preferences "Collaboration Sandal 2," Group 240 states that they will only pay $5,000 to have the site built with 20% paid at the signing of the agreements, that the store must be built within thirty days of the signed agreement, and that Member 634 must oversee the construction, marketing, design, and functionality of the web store. Group 240 sends an invitation to Members 22 and 634 to review each of their specific portions of the Working Profile Preferences for "Collaboration Sandal 2".

Member 634 accepts the Working Profile Preferences for "Collaboration Sandal 2" that he oversees the construction, marketing, design, and functionality of the web store. However, Member 22 opens the Working Profile Preferences Negotiation Engine for "Collaboration Sandal 2" and replies that instead he would like 5% of the Content Controller/Group 240's profits, he wants 45 days to build the site, and for this he will spend ten hours a month managing and upgrading the site for ten years.

Group 240 accepts the changes to Member 22's specific portion of the Working Profile Preferences for "Collaboration Sandal 2". The CWCS then generates two unique agreements based on the Working Profile Preferences for "Collaboration Sandal 2" for (Group 240 and Member 634) and (Group 240 and Member 22). Once all agreements are executed digitally, the CWCS opens a new Working Profile web design Studio for "Collaboration Sandal 2".

Group 240 contacts their apparel manufacturer, outside the CWCS, regarding the sandal manufacturing. To make the price point at $10 per pair of sandals, the manufacturer demands that 8,000 pairs be ordered, equaling $80,000. Group 240 agrees on the price and makes a paper agreement outside the CWCS with the manufacturer. Group 240 scans and attaches the manufacturing agreement to the Working Profile "Collaboration Sandals 1" for Member 634 to review and sign as well as Group 240 signing. The Working Profile for "Collaboration Sandals 1" digitally transmits the signed/executed copy of the agreement to the manufacturer. The Manufacturer then prints, signs, and mails via post the signed/executed agreement back to Group 240. Group 240 scans the final agreement that has been executed by all parties and puts it into Working Profile "Collaboration Sandal 1". Group 240 and Member 634 then each digitally confirm an account transfer from Working Profile "Collaboration Sandals 1" for $80,000 to the manufacture.

During a 45-day period, Member 22 has completed the web store and Member 634 has approved functionality and design of the store. The web store has been set up so that all funds from purchases are automatically deposited into the Master Profile, which is then transferred to Group 240's Profile for distribution. At that point, Member 634 and Member 22 would like to close the working profile for "Collaboration Sandal 2". After Group 240 reviews the site, they make the "Collaboration Sandal 2" locked and closed.

Group 240 and Member 634 open the web store and begin marketing the sandals to the general public. Both Group 240 and Member 634 agree to leave Working Profile "Collaboration Sandals 1" open due to future transactions, purchases and development.

Figure 5:
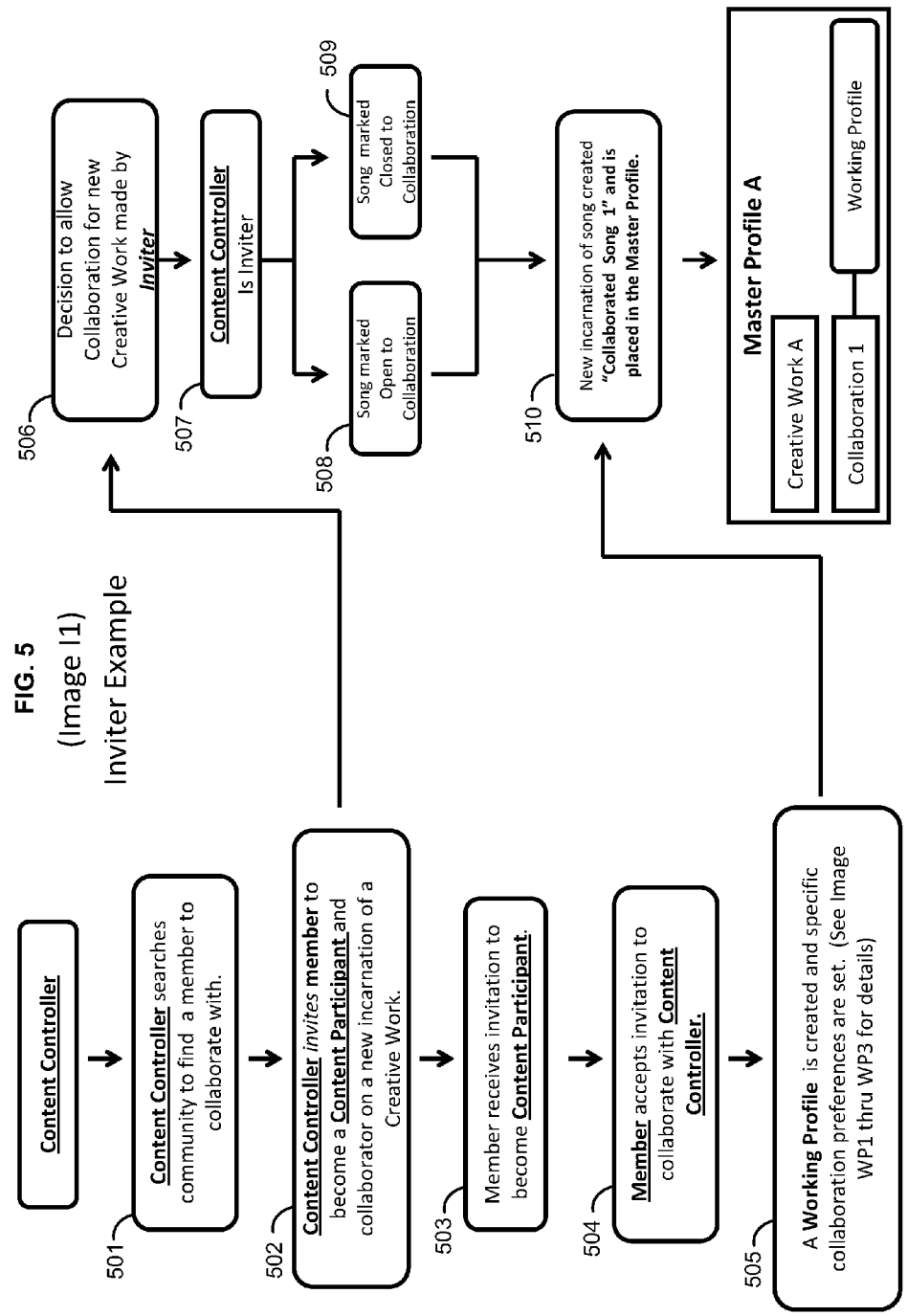
FIG. 5 is a flowchart of a method according to an exemplary embodiment, such that an Content Controller invites a user, entity, or the like to collaborate.

An example according to one embodiment in which the Content Controller is an Inviter is described and illustrated in FIG. 5. With reference to FIG. 5, a method of tracking collaboration according to some embodiments in which the Content Controller is an Inviter is implemented by a computer system (see FIG. 2) according to a process depicted in FIG. 5. A processor 22 executes instructions that instruct information to be saved to a storage medium 24 (see FIG. 2). In this example, the Inviter controls the option for Open or Closed Collaboration for the creative work the collaborators create.

Referring to FIG. 5, the "Content Controller" is the one who created the creative work that was uploaded into the Profile, via the CWCS. In step 501, the Content Controller searches the CWCS community, via a CWCS interface, to find someone to collaborate with. After finding someone to collaborate with, in step 502, the Content Controller sends an invitation, via a CWCS interface, to a Member asking if the Member would like to work together with the Content Controller to create a new incarnation of the original creative work and become a Content Participant.

In some preferred embodiments, the decision to allow collaboration belongs to the Inviter (step 506). In this case, the Content Controller/Invitee invites the Content Participant (step 507) via a CWCS interface. The Content Controller/Invitee makes the decision for the new Collaborated Work to be Open to Collaboration (step 508) or Closed to Collaboration (step 509). Finally, a new Collaborated Work is created through collaboration through the CWCS (step 510).

Alternatively, in step 503, the Content Participant (i.e., an Invitee) receives an invitation, from the Content Controller, through the CWCS, to collaborate. If the Content Participant (i.e., Invitee) accepts the invitation to collaborate with the Content Controller (in step 504), a Working Profile is created with specific collaboration preferences being set (step 505). In the Working Profile, the Content Controller and Content Participant share ideas to create a new incarnation of the original creative work. Finally, in step 510, a new incarnation of a Collaborated Work is created through collaboration.

Figure 6:
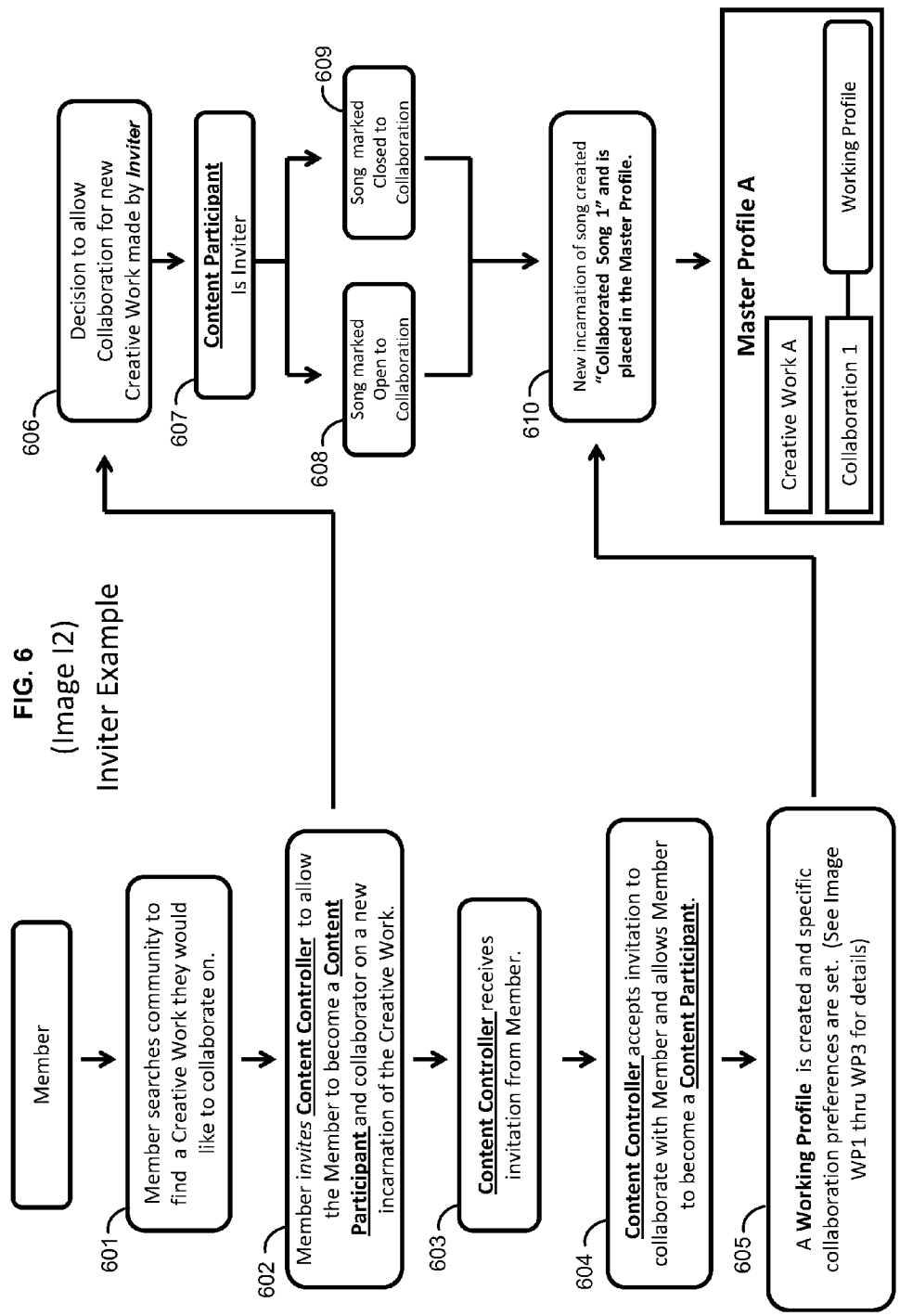
FIG. 6 is a flowchart of a method according to an exemplary embodiment, such that a member invites a Content Controller to allow the member to become a collaborator.

An example according to one embodiment in which the Member is an Inviter is described and illustrated in FIG. 6. With reference to FIG. 6, a method of tracking collaboration according to some embodiments in which the Member is an Inviter is implemented by a computer system (see FIG. 2) according to a process depicted in FIG. 6. A processor 22 executes instructions that instruct information to be saved to a storage medium 24 (see FIG. 2).

In step 601 of FIG. 6, a Member searches the CWCS community, via a CWCS interface, to find a creative work the Member would like to collaborate on. After the Member finds someone to collaborate with (or a work available to collaborate on), in step 602, the Member sends an invitation to the Content Controller, via a CWCS interface, to inquire whether the Content Controller is interested in collaborating with the Member to create a derivative work or other new incarnation of the original creative work (the original work being, e.g., a Source Work or Collaboration Work previously created from a Source Work).

If the Member decides to create a new Creative Work instead of collaborating on an existing work (step 606), the Content Participant is the Inviter (in step 607). The Member is the Inviter and makes the decision for the new Collaborated Work to be Open to Collaboration (step 608) or Closed to Collaboration (step 609). Finally, the new work is created through collaboration through the CWCS (step 610).

If, instead, the Member decides to collaborate on an existing work, a Content Controller receives the invitation to collaborate from the Member (step 602). If the Member wishes to collaborate on a new incarnation of an existing work, the Member invites the Content Controller to allow the Member to become a Content Participant (see step 603). If the Content Controller accepts the invitation to collaborate with the Member, in step 604, the Member becomes a Content Participant. In step 605, a Working Profile is created with specific collaboration preferences being set. In the Working Profile, the Content Controller and Content Participant share ideas to create a new incarnation of the original creative work (Source Work or Collaboration Work). Finally, the new incarnation of the work is created through collaboration through the CWCS (step 610).

Figure 7:
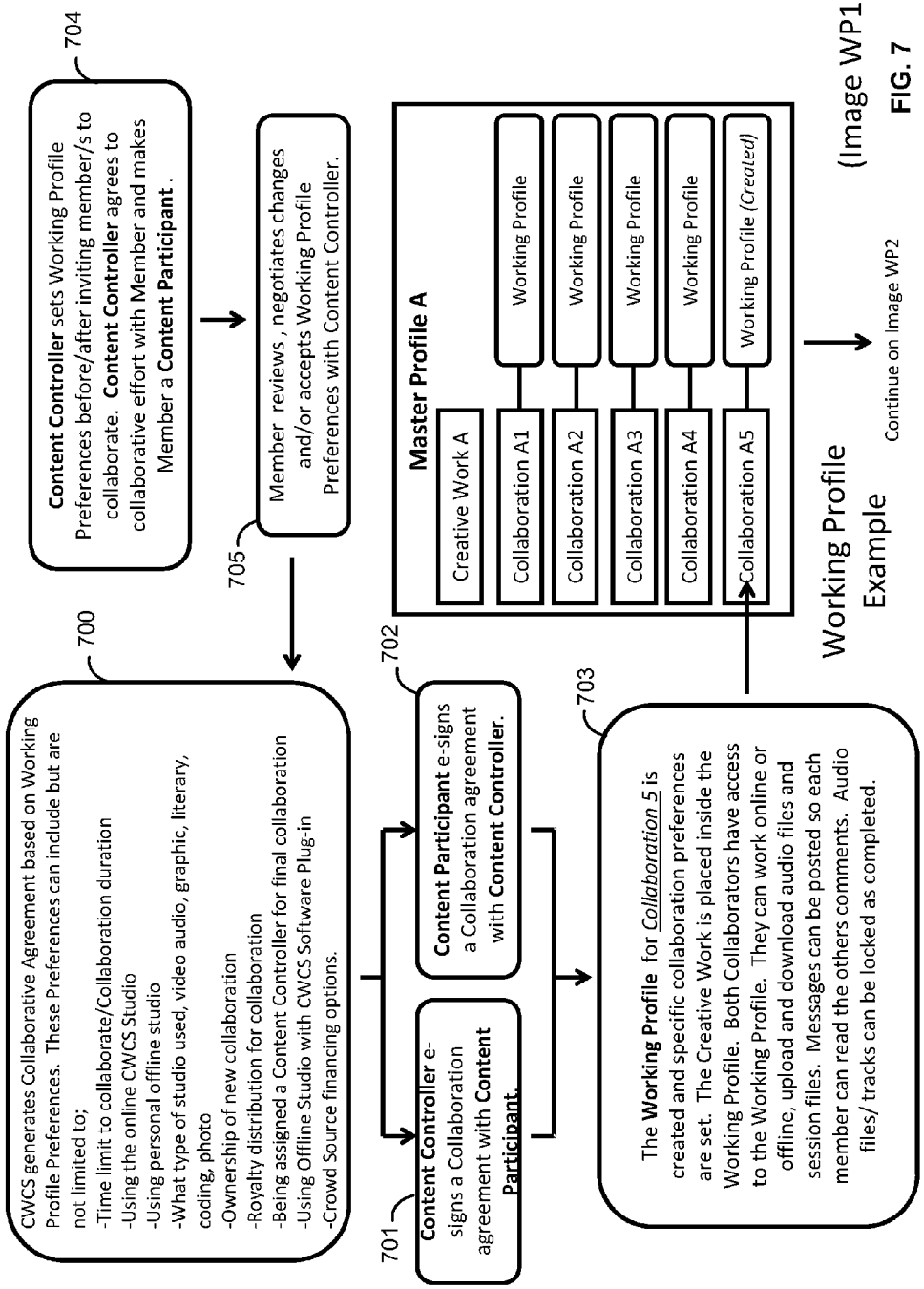
FIG. 7 is a flowchart of a method according to an exemplary embodiment, involving a Working Profile.
Figure 8:
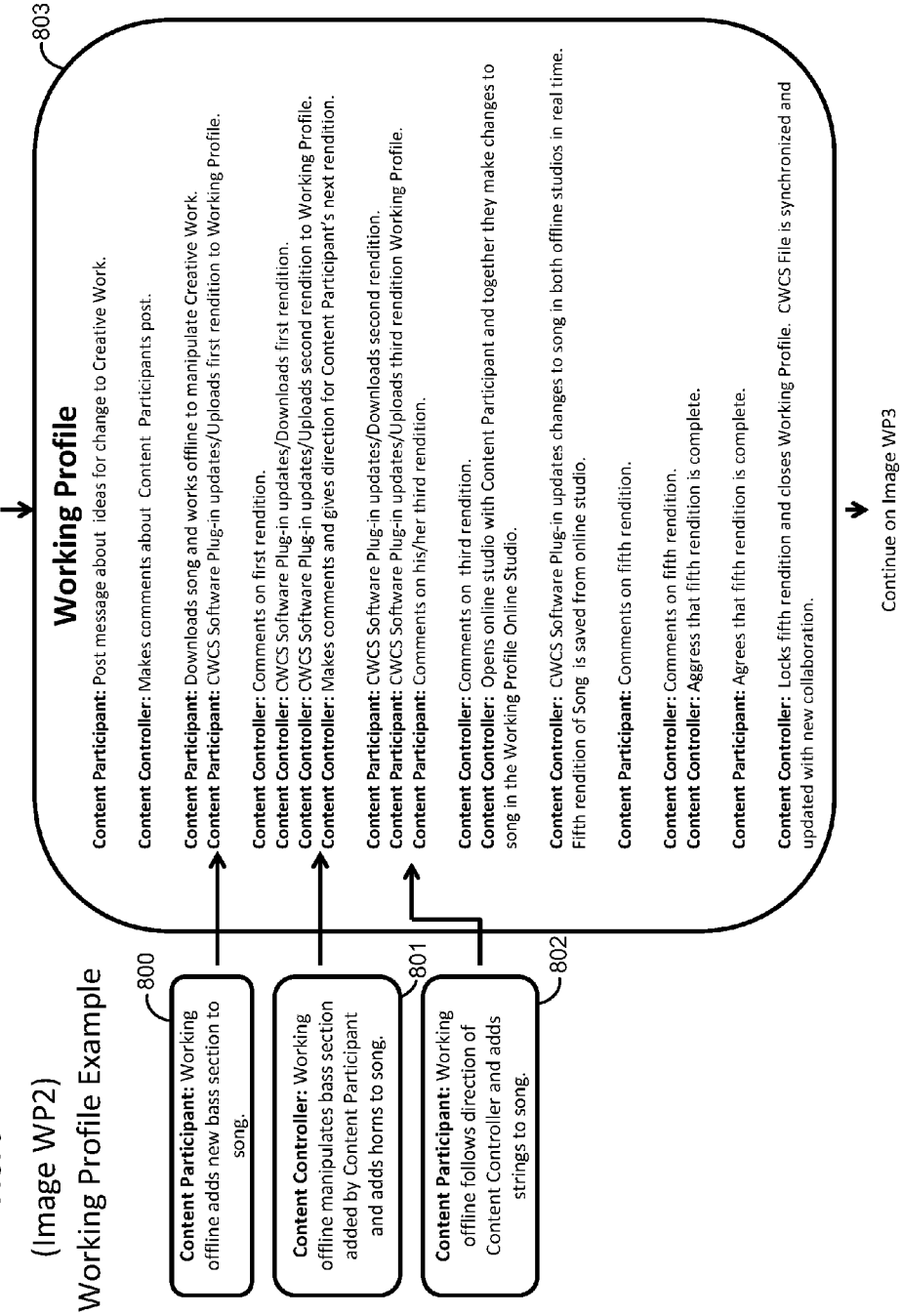
FIG. 8 is a flowchart of a method according to an exemplary embodiment, such that it is a continuation of FIG. 7.
Figure 9:
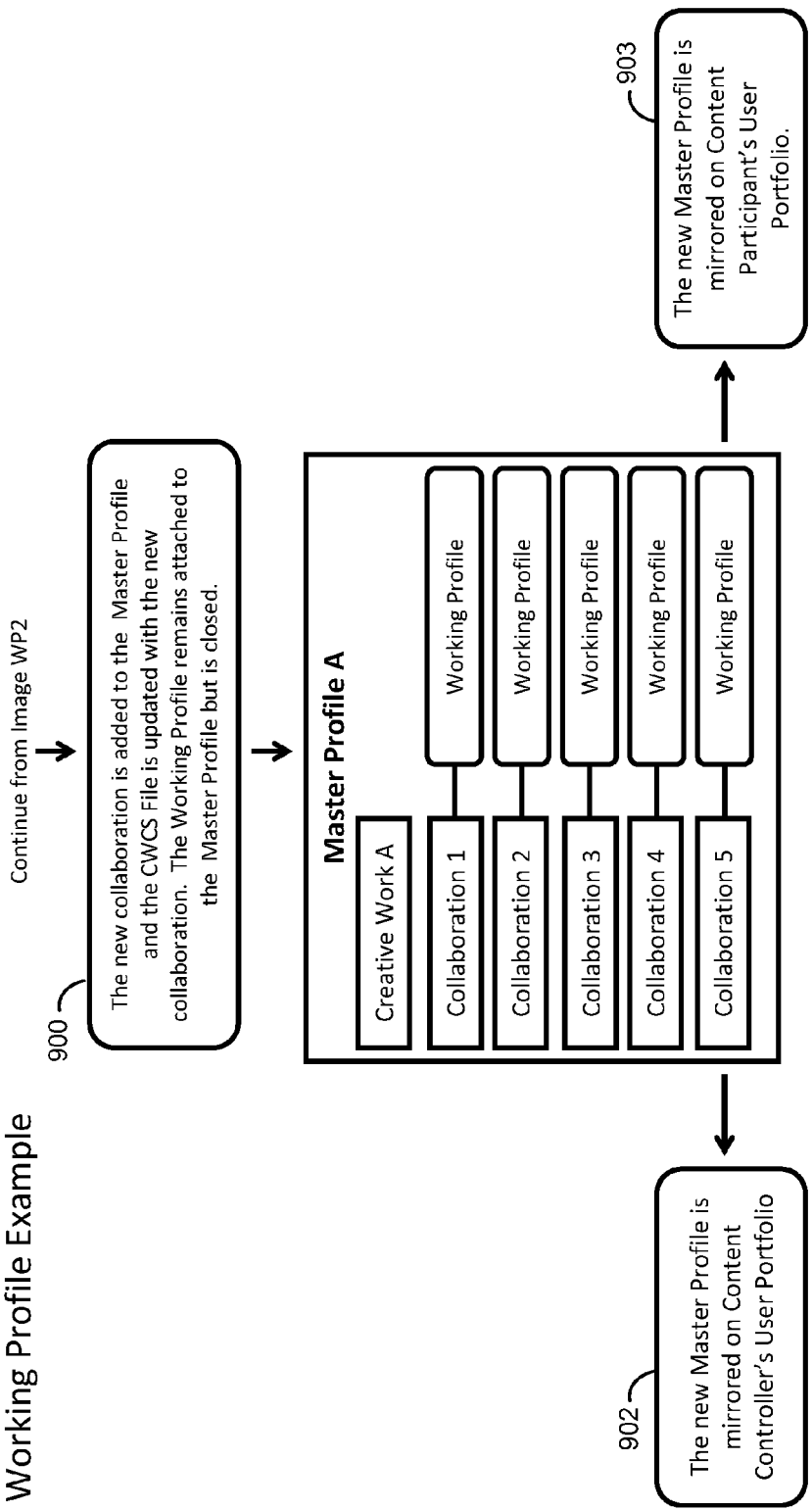
FIG. 9 is a flowchart of a method according to an exemplary embodiment, such that it is a continuation of FIG. 8.

The following is an example according to one embodiment involving a working profile is described and illustrated in FIGS. 7-9. With reference to FIGS. 7-9, a method of tracking collaboration according to some embodiments in which the Member is an Inviter is implemented by a computer system (see FIG. 2) according to a process depicted in FIGS. 7-9. A processor 22 executes instructions that instruct information to be saved to a storage medium 24 (see FIG. 2).

In step 700 of FIG. 7, the CWCS generates a Collaborative Agreement based on Working Profile Preferences. In some embodiments, these Preferences include whether to include a time limit to collaborate, a collaboration duration, whether to use the Online Studio, whether to use the Offline Studio, using the CWCS Software Plug-in, what type of studio used (video audio, graphic, literary, coding, photo, etc.), ownership details of a new collaboration, for exploitation of the resulting Collaborative Work(s) including all accounting information such as billing and receivables, crowd sourcing accounting, Crowd Funding options and accounting, being assigned a content controller for new collaboration, qualifications for a collaborator, Qualification Rating, location restrictions, regulatory restrictions (e.g., required permits, licenses, governmental clearances, etc.), who has archive access to the working profile, creating a new working profile from a old working profile, setting restrictions on what a Master Profile can display and/or mirror, etc. A Content Controller sets the Working Profile Preferences about a collaborative effort.

The Content Controller determines whether to agree to a collaborative effort with a Member and makes the Member a Content Participant. The Member determines whether to agree to the collaborative effort with the Content Controller.

In some preferred embodiments, in step 704, the Content Controller sets the Working Profile preferences before inviting someone to Collaborate. In some preferred embodiments, the Working Profile preferences can be set after inviting someone to Collaborate. In some preferred embodiments, the Content Controller and the Content Participant (all parties involved in collaboration) can work together on setting the Working Profile preferences.

If the Member agrees to the Working Profile Preferences (see step 705), the CWCS generates a Collaborative Agreement based on the Working Profile Preferences. In some embodiments, both the Content Controller (in step 701) and the new Content Participant/Member (in step 702) are able to e-sign the Collaboration Agreement. "E-sign" refers to the providing of a digital signature, a verified or authenticated digital signature (e.g., the type provided by E-Original (see eoriginal.com), and the like.

Once the agreements are e-signed or otherwise agreed to, a Working Profile is created, in step 703. In some embodiments, the Source Work/CWCS File is placed inside the Working Profile. Both Collaborators have access to the Working Profile. In some embodiments, the Collaborators can work online or offline, upload and download, and/or use the CWCS File and/or CWCS Software Plug-in for updating of files (such as media files, session files, etc.) in real time. In some embodiments, messages can be posted manually or automatically so that Collaborators can read each other's messages and comments. Media files/tracks/renditions can be locked as completed.

Next, in regard to FIG. 8 (which is a flowchart that is a continuation of the flowchart of FIG. 7), some embodiments support manual update to the Working Profiles, automatically updated changes to the Working Profile, or a combination of those.

As shown in FIG. 8, in some embodiments, the Content Controller and the Content Participant work offline (steps 800, 801, 802) and/or online. In some embodiments, they share messages and/or upload and/or download new renditions of the Source Work.

When the Content Controller and Content Participant agree that a draft (rendition) is finished or complete, in some embodiments, the Content Controller locks the final rendition and closes the Working Profile (step 803).

Next, in regard to FIG. 9 (which is a flowchart that is a continuation of the flowchart of FIG. 8), some embodiments support adding the new Collaboration to the Master Profile. In some embodiments support updating with the CWCS File (step 900). Then, in some embodiments, the Working Profile is closed. Finally, in some embodiments, the Master Profile is mirrored and updated on the Content Controller (step 902) and Content Participant's (step 903) User Portfolios.

Figure 10:
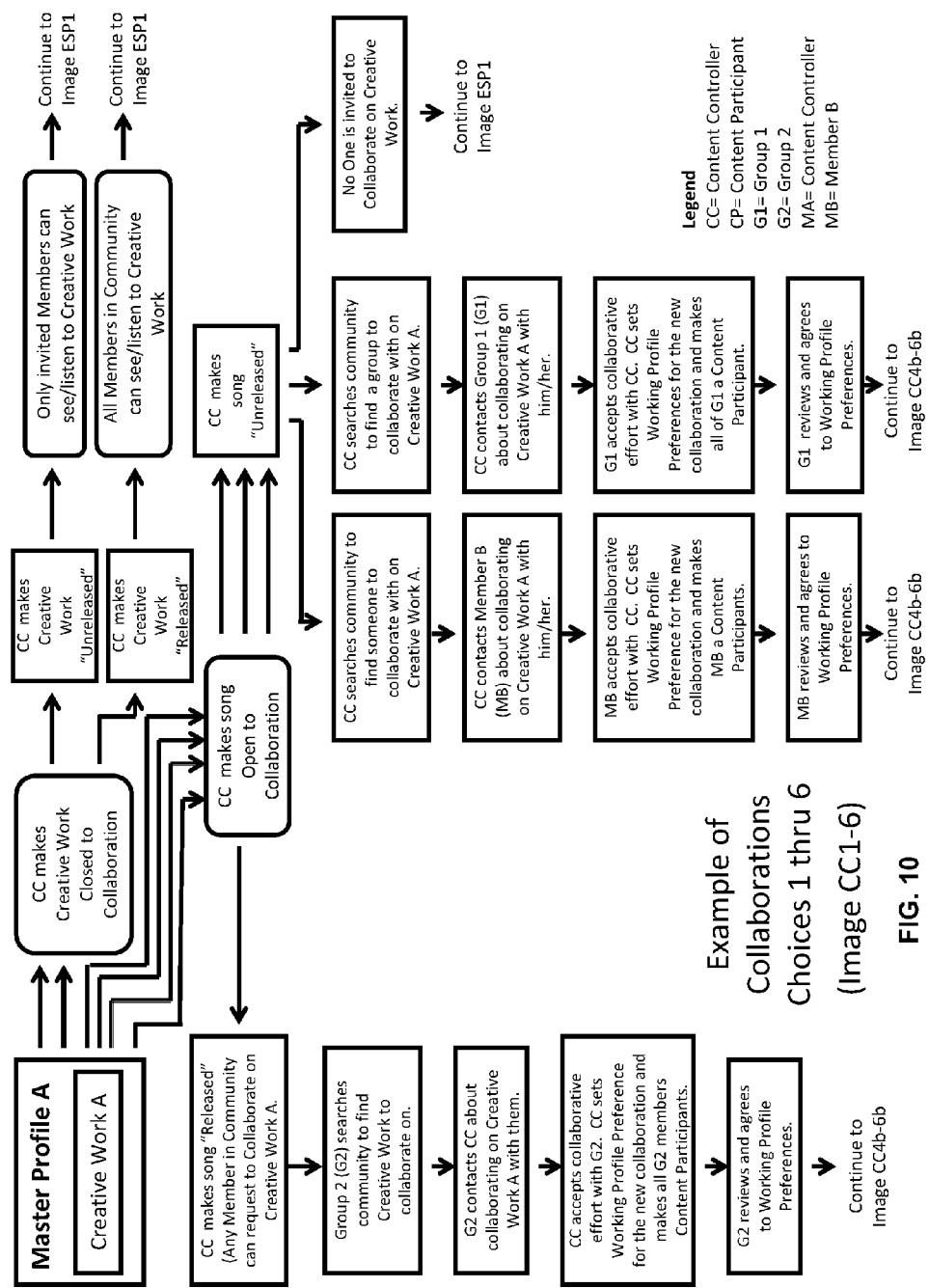
FIG. 10 is a diagram according to an exemplary embodiment, illustrating an example of effects of setup and collaboration choices on a Master Profile.

FIG. 10 illustrates an example according to one embodiment, and refers to effects on a Master Profile for Collaboration Choices 1 thru 9. In the exemplary embodiment of FIG. 10, Member A uploads a Creative Work and becomes a Content Controller. The Creative Work is given a unique Master Profile and CWCS File. In this example, it is Master Profile A. The Master Profile A is mirrored in the Content Controllers/Member A's portfolio (located in Member A's Member Portfolio).

In some embodiments, a "Member's Portfolio" is a Member's page that includes a list of the Source Works that have been uploaded by the Member. In some preferred embodiments, recordings of Source Works can be accessed in the Member's Portfolio. In some preferred embodiments, a Member's Portfolio can include a list of, and in some preferred embodiments, access to, Collaborative Works that a Member has Collaborated on.

According to some embodiments, the Master Profile A is mirrored in other Collaborators' portfolios with the Creative Work A as well as other collaborations. In some embodiments, a stand-alone Master Profile, or a mirrored Master Profile in a Member's Portfolio, display the Creative work and all renditions of that Creative Work.

Figure 15:
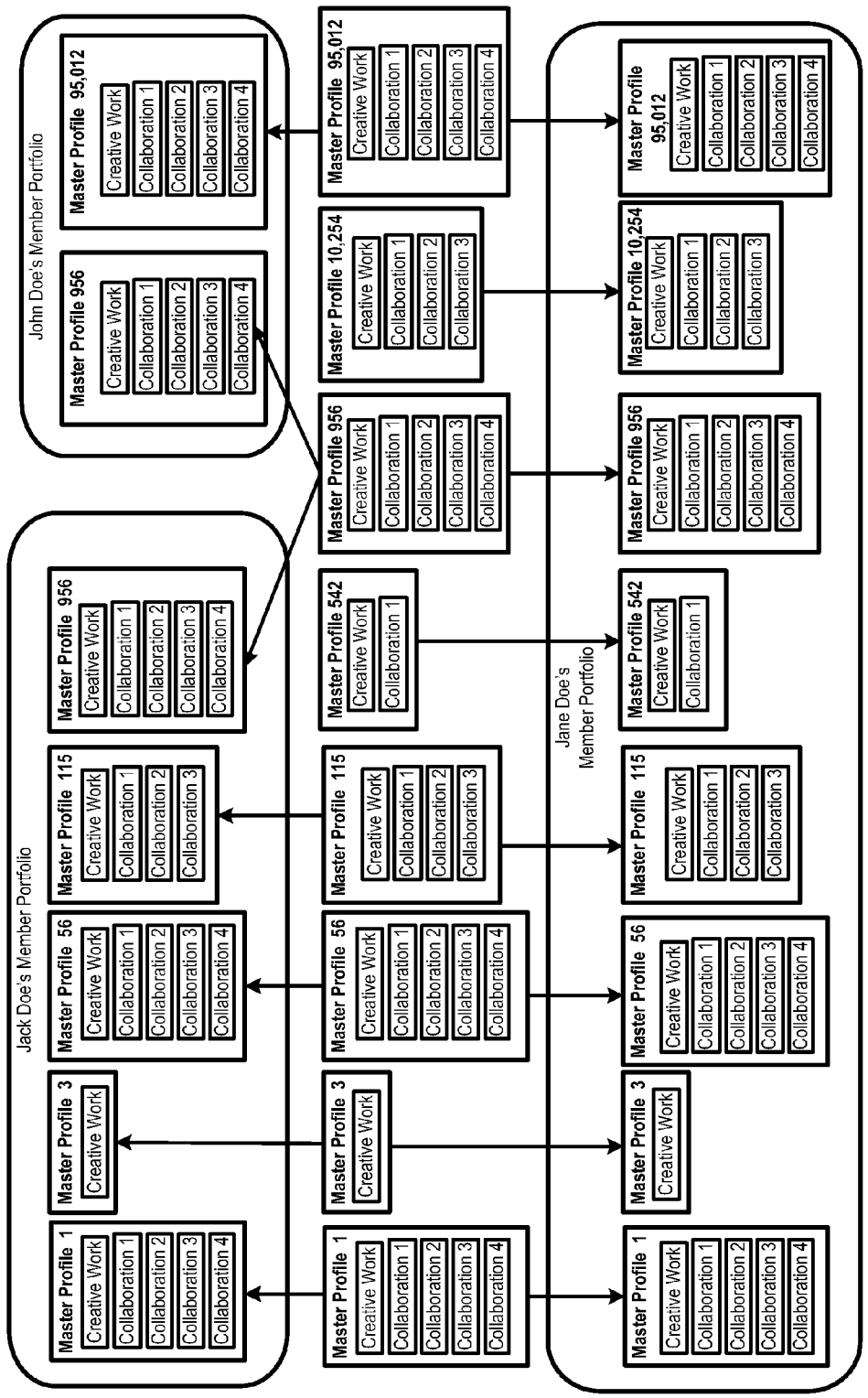
FIG. 15 is a diagram according to an exemplary embodiment, illustrating an example of a Master Profile mirrored on a Member Portfolio.

In the following examples, only one Master Profile is displayed in a Members Portfolio, but, as displayed in FIG. 15, in some embodiments, a Member's Portfolio could have multiple or unlimited number of Master Profiles mirrored in their Member Portfolio.

EXAMPLE 1

Figure 11:
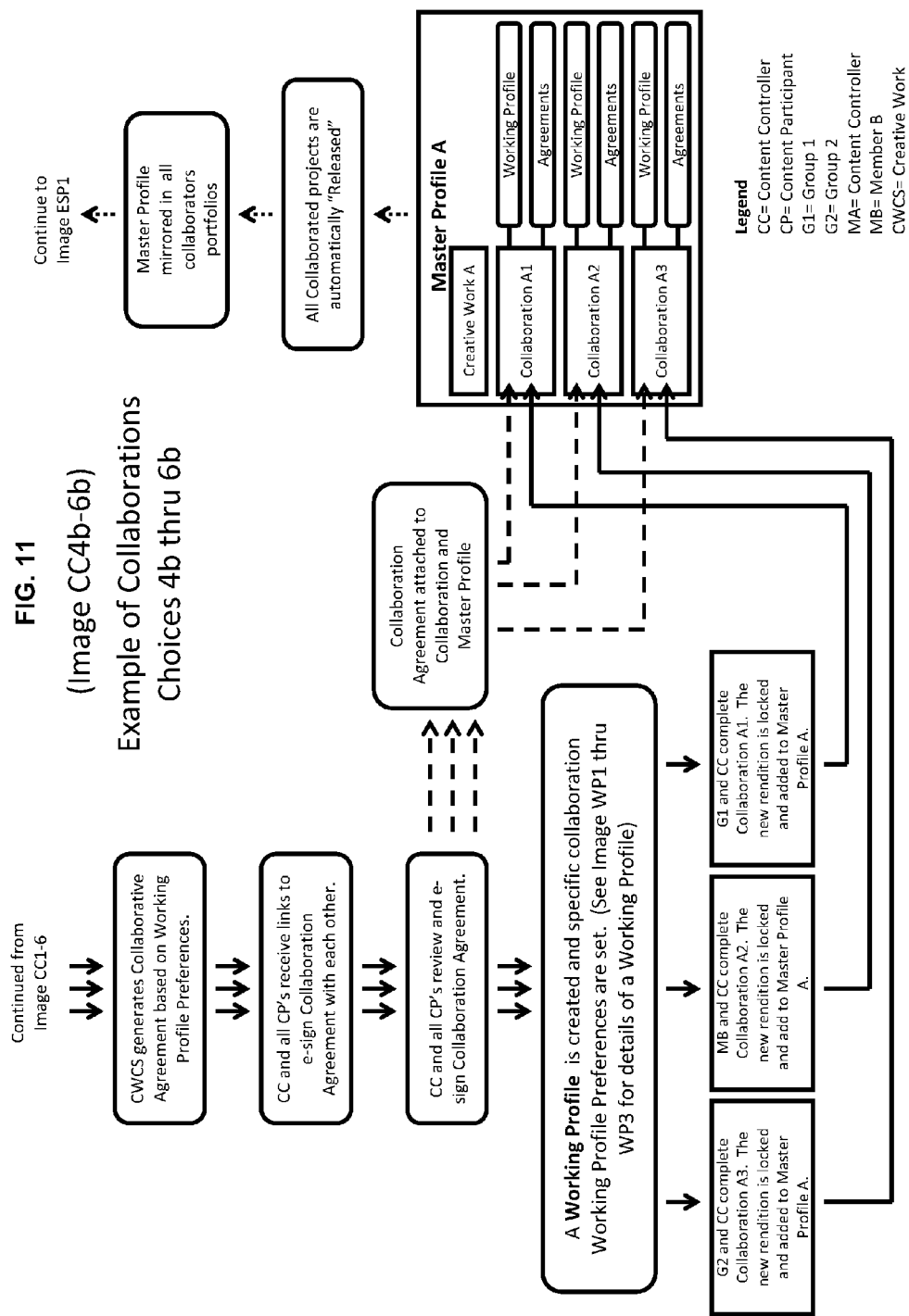
FIG. 11 is a diagram according to an exemplary embodiment, illustrating another example of collaboration choices.

According to the exemplary embodiment of Example 1, Member A has set the Master Profile Preferences to be "Closed to Collaboration" and "Unreleased." With reference to FIG. 11, the Original Composer/Content Controller (Member A) has made Creative Work A Closed to Collaboration. Next, in the exemplary embodiment, Creative Work A is made Unreleased. The result of these two actions makes Creative Work A visible only to Members who are invited to view or audition it. No one is authorized to collaborate on Creative Work A.

Referring to the diagram of FIG. 10 (and noting that in Example 1, the Master Profile A will only include Creative Work A and none of the Collaborations listed in the diagram), choices made by the Original Composer/Content Controller have had no effect on Master Profile A, or the mirror of Master Profile A in Members A's Portfolio. Note a stand-alone Master Profile, or a mirrored Master Profile in a Members Portfolio, display the Creative Work and all renditions of that Creative Work.

EXAMPLE 2

According to an exemplary embodiment of Example 2 illustrated by FIG. 11, Member A has set the Master Profile Preferences to be "Closed to Collaboration" and "Released." We show these as two distinct actions in this example. The Original Composer/Content Controller (Member A) makes Creative Work A Closed to Collaboration. Next Creative Work A is Released. The result of these two actions makes Creative Work A visible to all Members in the community but no one can collaborate on Creative Work A.

Referring again to FIG. 10 (note that in Example 2, the Master Profile A will only include Creative Work A and none of the Collaborations listed in the diagram), choices made by the Original Composer/Content Controller have had no effect on Master Profile A or the mirror of Master Profile A in Member A's Portfolio. Note a stand-alone Master Profile, or a mirrored Master Profile in a Members Portfolio, display the Creative work and all renditions of that Creative Work.

EXAMPLE 3

According to an exemplary embodiment of Example 3 illustrated by FIG. 11, Member A has set the Master Profile Preferences to be "Open to Collaboration" and "Unreleased" The Original Composer/Content Controller (Member A) makes Creative Work A Open to Collaboration. Next, Creative Work A is made Unreleased. In this example, no one is invited to collaborate on Creative Work A. The result of these actions makes Creative Work A unavailable to anyone to collaborate on. Referring back to FIG. 10 (note that in Example 3 the Master Profile A will only include Creative Work A and none of the Collaborations listed in the diagram), the choices made by the Original Composer/Content Controller have had no effect on Master Profile A or the mirror of Master Profile A in Member A's Portfolio. Note a stand-alone Master Profile, or a mirrored Master Profile in a Members Portfolio, display the Creative work and all renditions of that Creative work.

EXAMPLE 4

According to an exemplary embodiment of Example 4 illustrated by FIG. 11, Member A has set the Master Profile Preferences to be "Open to Collaboration" and "Unreleased." The Original Composer/Content Controller (Member A) makes the Creative Work A Open Example 1: In Example 1, Member A has set the Master Profile Preferences to be "Closed to Collaboration" and "Unreleased." The Original Composer/Content Controller (Member A) has made Creative Work A Closed to Collaboration. Next Creative Work A is made Unreleased. The result of these two actions makes Creative Work A visible only to Members who are invited to view or audition it. No one is authorized to collaborate on Creative Work A. Referring back to FIG. 10 (note that in Example 1 the Master Profile A will only include Creative Work A and none of the Collaborations listed in the diagram), the choices made by the Original Composer/Content Controller have had no effect on Master Profile A, or the mirror of Master Profile A in Members A's Portfolio. Note a stand-alone Master Profile, or a mirrored Master Profile in a Members Portfolio, display the Creative work and all renditions of that Creative work.

EXAMPLE 5

Figure 12:
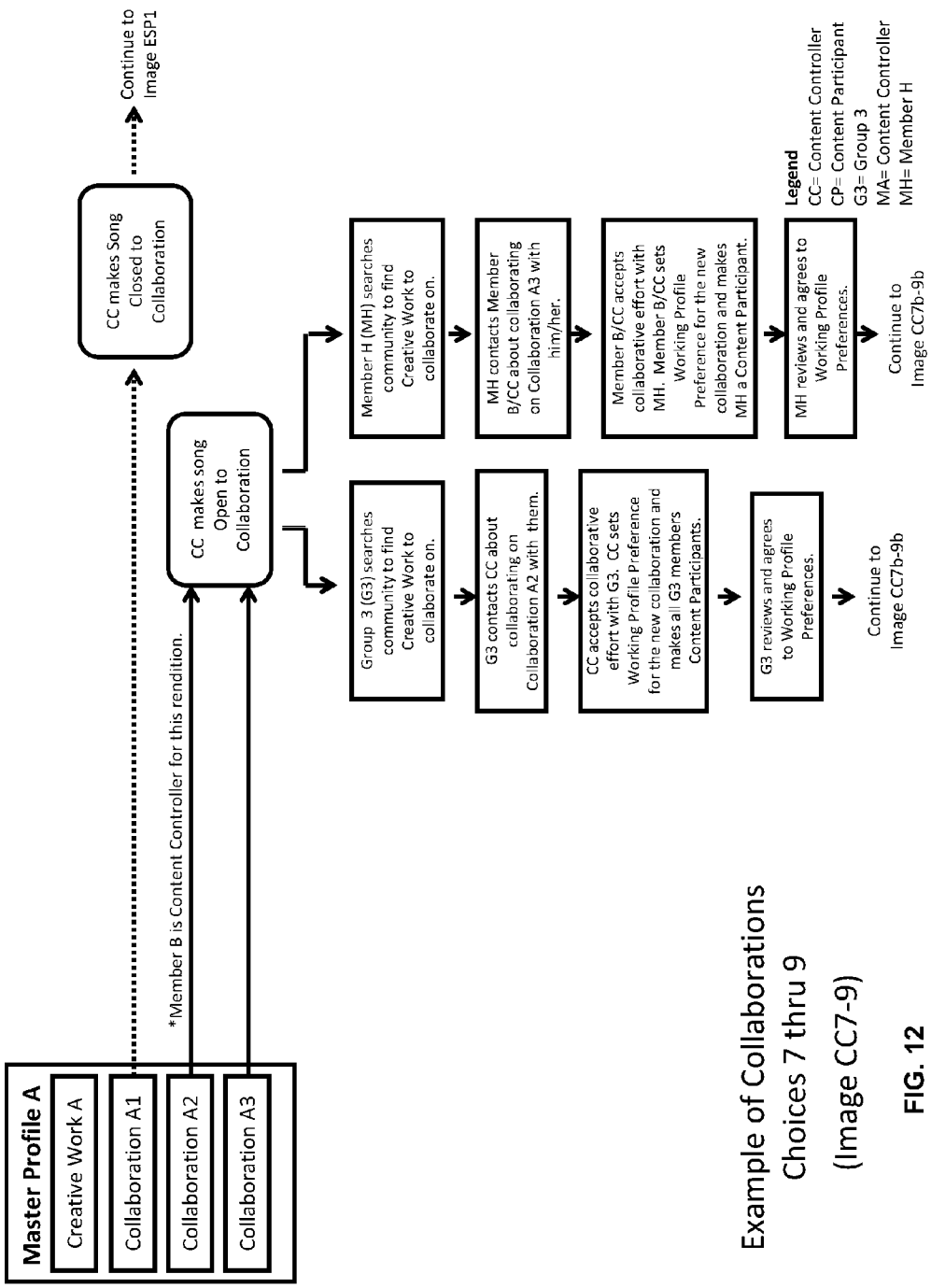
FIG. 12 is a diagram according to an exemplary embodiment, illustrating yet another example of collaboration choices.

In Example 5, according to an exemplary embodiment of Example 5 illustrated by FIG. 11, Member A has set the Master Profile Preferences to be "Open to Collaboration" and "Unreleased." (Note that Example 5 is virtually identical to Example 4 with the exception of the Content Controller collaborating with an individual Member as opposed to a group.) The Original Composer/Content Controller (Member A) makes Creative Work A Open to Collaboration. Next, Creative Work A is made Unreleased. The Original Composer/Content Controller searches the community to find a Member to collaborate with. Next, the Original Composer/Content Controller sends an invitation to Member B to see if Member B would like to collaborate on Creative Work A. Next, Member B accepts the invitation to collaborate with the Original Composer/Content Controller and the Content Controller sets the Working Profile Preferences and makes "Member B" a Content Participant. As part of the Working Profile Preferences, Member A makes Member B the Content Controller for the new collaboration, Collaboration A2. Also as part of this same Working Profile Preferences for Collaboration A2 Member B is allowed to makes Collaboration A2 "Open to Collaboration" (Note, the result of making Member B the Content Controller for Collaboration A2 is displayed in Example 8, below.) Member B/Content Participant reviews the Working Profile Preferences. Referring now the exemplary embodiment illustrated by FIG. 12, the CWCS generates Collaboration agreements for all the members based on the Working Profile Preferences. Next, both the Content Controller and the Content Participant receive links to e-sign the Collaboration agreements. Both the Content Controller and the Content Participant review and e-sign the Collaboration agreements, which, in some preferred embodiments, is stored in the Creative Works Collaborative System and presented to Member B/Content Participant online. In some preferred embodiments, Member B/Content Participant executes the Collaboration Agreement document digitally. In some preferred embodiments, execution of the Collaboration Agreement is authenticated via means such as those used by e-Original (See eoriginal.com.) In some preferred embodiments, execution of the Collaboration Agreement is authenticated via mail or post.

Note that, at this point, two actions happen in parallel, according to some embodiments: (i) the collaboration agreement, in this example, is attached to Creative Work A as Collaboration A2 in the Master Profile A and (ii) a Working Profile is created for Member B/Content Participant and the Original Composer/Content Controller. Next, Member B/Content Participant and the Original Composer/Content Controller complete the collaboration and a new incarnation/rendition of the Creative Work A is created, "Collaboration A2." The new rendition is locked and added to Master Profile A. Next, all collaborated projects are automatically made Released. Finally, Master Profile A is mirrored in all collaborators portfolios.

Now referring again to FIG. 10, Master Profile A includes the new Collaboration A2 as part of Master Profile A. (Note that in Example 5, the Master Profile A will include Creative Work A l Collaboration A1 and Collaboration A2 listed in the diagram.) The Original Composer/Content Controller and Member B/Content Participant also show the new Collaboration A2 in Master Profile A mirrored in their Member's Portfolio. Note a stand-alone Master Profile or a mirrored Master Profile in a Members Portfolio, display the Creative work and all renditions of that Creative work.

EXAMPLE 6

According to an exemplary embodiment of Example 6 illustrated by FIG. 11, Member A has set the Master Profile Preferences to be "Open to Collaboration" and "Released". The Original Composer/Content Controller (Member A) makes Creative Work A Open to Collaboration. Next, Creative Work A is Released to the Community. As a Released Creative Work, any member in the community can request to collaborate on Creative Work A. Group 2 searches the community to find a Creative Work to collaborate on. Next, Group 2 contacts the Original Composer/Content Controller about collaborating on Creative Work A with them. Next, the Original Composer/Content Controller accepts the invitation to collaborate with Group 2 and the Content Controller sets the Working Profile Preferences and makes "Group 2" members Content Participants. Group 2/Content Participants review the Working Profile Preferences. Now referring to the exemplary embodiment illustrated by FIG. 12, the CWCS generates Collaboration agreements for all the members based on the Working Profile Preferences. Next, both the Content Controller and the Content Participants receive links to e-sign the Collaboration agreements.

Both the Content Controller and the Content Participants review and e-sign the Collaboration agreements, which, in some preferred embodiments, is stored in the Creative Works Collaborative System and presented to Group 2/Content Participants online. In some preferred embodiments, Group 2/Content Participants execute the Collaboration Agreement document digitally. In some preferred embodiments, execution of the Collaboration Agreement is authenticated via means such as those used by e-Original (See eoriginal.com.) In some preferred embodiments, execution of the Collaboration Agreement is authenticated via mail or post.

Two actions happening substantially simultaneously (in some embodiments) or in parallel: (i) the collaboration agreement, in this example, is attached to Creative Work A as Collaboration A3 in the Master Profile A, and (ii) a Working Profile is created for Group 2/Content Participants and the Original Composer/Content Controller. Next, Group 2/Content Participants and the Original Composer/Content Controller complete the collaboration and a new incarnation/rendition of Creative Work A is created, "Collaboration A3." The new rendition is locked and added to Master Profile A. Next, all collaborated projects are automatically made Released. Finally, the Master Profile is mirrored in all collaborators' portfolios.

Now referring again to FIG. 10, Master Profile A includes the new Collaboration A3 as part of Master Profile A. (Note that in Example 6 the Master Profile A will only include Creative Work A, Collaboration A1, Collaboration A2 and Collaboration A3 listed in the diagram). The Original Composer/Content Controller and Group 2/Content Participants also show the new Collaboration A3 in the Master Profile A mirrored in their Note a stand-alone Master Profile, or a mirrored Master Profile in a Members Portfolio, display the Creative Work and all renditions of that creative work.

EXAMPLE 7

Figure 13:
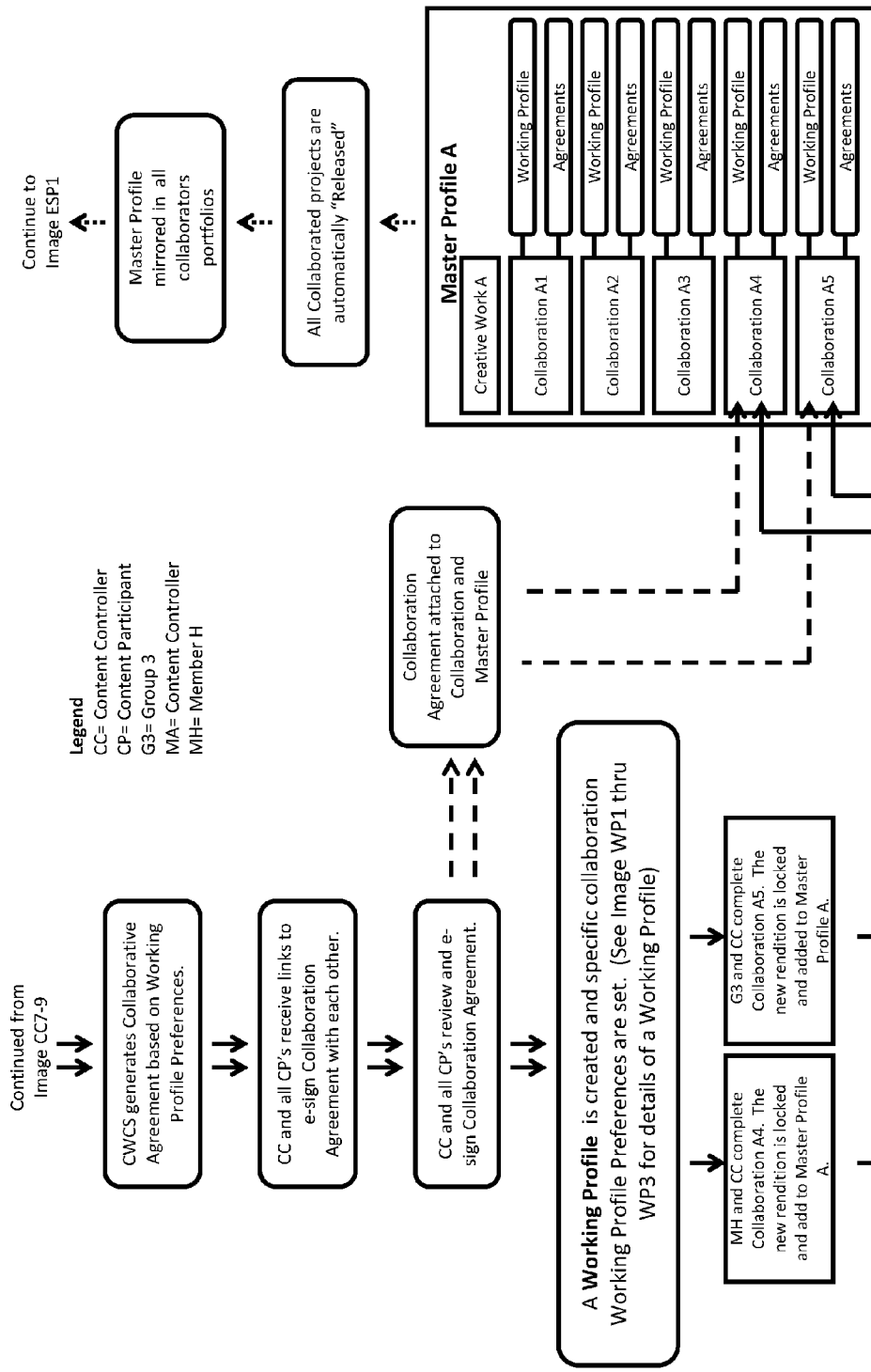
FIG. 13 is a diagram according to an exemplary embodiment, illustrating an example of still more collaboration choices.

According to an exemplary embodiment of Example 7 illustrated by FIG. 13, Member A had set the Working Profile Preferences for Collaboration A1 to be "Closed to Collaboration." (Note that, Master Profile A has the three Collaborative efforts attached to the profile.) The Content Controller (Member A) for Collaboration A1 has made Collaboration A1 Closed to Collaboration. Referring again to FIG. 10 (Note that in Example 7 the Master Profile A will only include Creative Work A, Collaboration A1, Collaboration A2 and Collaboration A3 listed in the diagram), there have been no changes to Master Profile A because no new collaborations were made due to the decision of the Content Controller to make Collaboration A1 Closed to Collaboration. Note a stand-alone Master Profile, or a mirrored Master Profile in a Members Portfolio, display the Creative work and all renditions of that Creative work.

EXAMPLE 8

Figure 14:
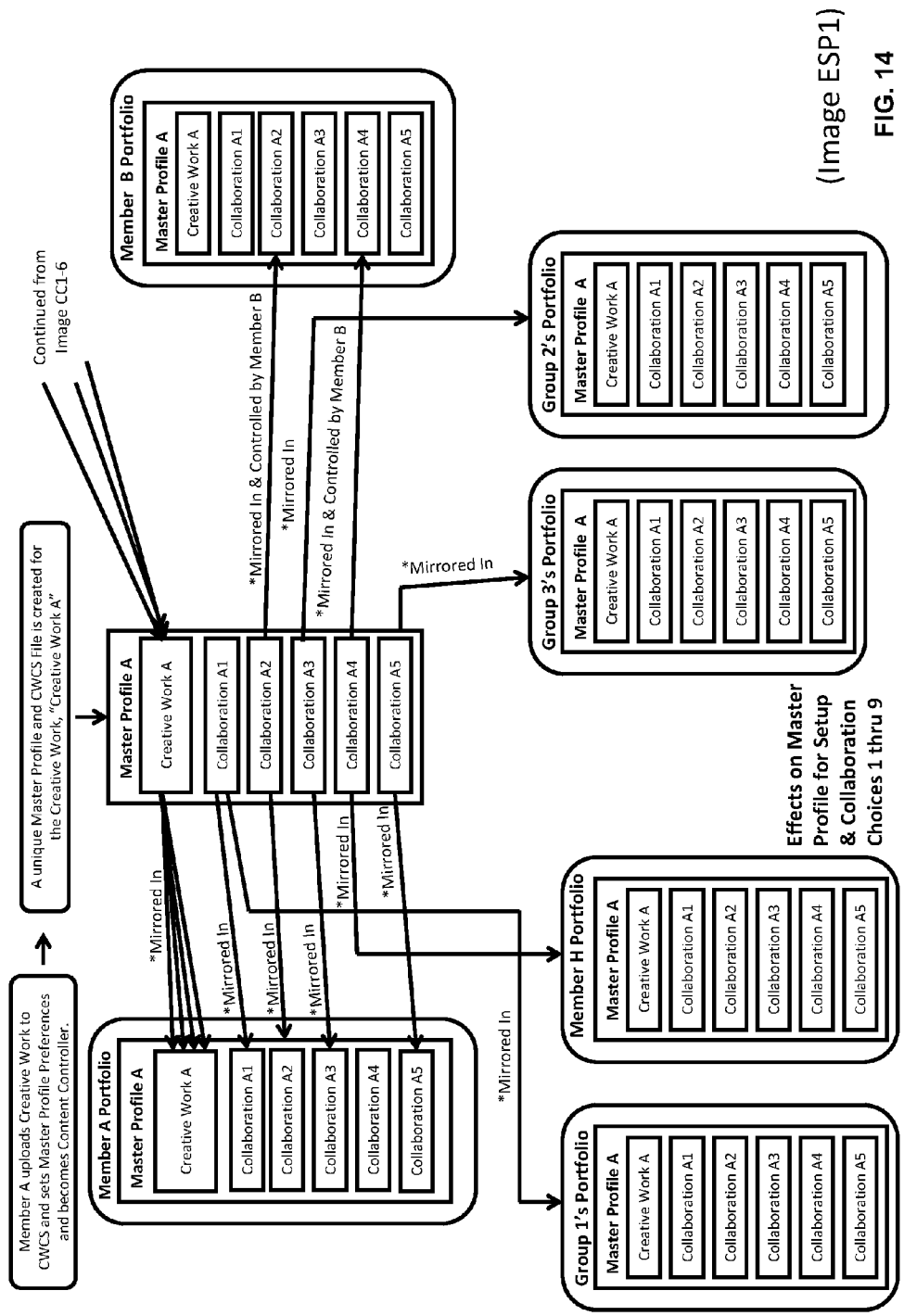
FIG. 14 is a diagram according to an exemplary embodiment, illustrating still another example of collaboration choices.

According to an exemplary embodiment of Example 6 illustrated by FIG. 13, Member A had set the Working Profile Preferences for Collaboration A2 to make Member B the Content Controller for Collaboration A2 as described in Example 5. Member B made Collaboration A2 "Open to Collaboration" in the Working Profile Preferences for Collaboration A2. The Content Controller/Member B makes the Collaboration A2 Open to Collaboration. Member H searches the community to find a Creative Work to collaborate on. Next, Member H contacts the Content Controller/Member B about collaborating on Collaboration A2 with the Content Controller/Member B. Next, the Content Controller accepts the invitation to collaborate with Member H and the Content Controller/Member B sets the Working Profile Preferences and makes "Member H" a Content Participant. Next, Member H/Content Participant reviews the Working Profile Preferences. Referring now to the exemplary embodiment of FIG. 14, the Creative Works Collaboration System generates Collaboration agreements for all the members based on the Working Profile Preferences. Next, both the Content Controller and the Content Participants receive links to e-sign the Collaboration agreements. Both the Content Controller and the Content Participants review and e-sign the Collaboration agreements, which, in some preferred embodiments, is stored in the Creative Works Collaborative System and presented to Member H/Content Participant online.

In some preferred embodiments, Member H/Content Participant execute the Collaboration Agreement document digitally. In some preferred embodiments, execution of the Collaboration Agreement is authenticated via software, such as via software similar to that of e-Original. In some preferred embodiments, execution of the Collaboration Agreement is authenticated via mail or post.

At this point, in some embodiments, two actions happening substantially simultaneously or in parallel in some embodiments: (i) the collaboration agreement, in this example, is attached to Creative Work A as Collaboration A4 in the Master Profile A, and (ii) a Working Profile is created for Member H/Content Participant and the Content Controller/Member B. Next, Member H/Content Participant and the Content Controller/Member B complete the collaboration and a new incarnation/rendition of Collaboration A2 is created, "Collaboration A4." The new rendition is locked and added to Master Profile A. Next, all collaborated projects are automatically made Released. Finally, the Master Profile A is mirrored in all collaborators portfolios. (Note that in this example the Member B/Content Controller for Collaboration A2 has now become the Content Controller for 'Collaboration A4 as well.) Now referring again to FIG. 10, Master Profile A includes the new Collaboration A4 as part of Master Profile A. (Note that in Example' 8 the Master Profile A will only include Creative Work A, Collaboration A1, Collaboration A2, Collaboration A3 and Collaboration A4 listed in the diagram). The Content Controller/Member B has Collaboration A4 mirrored in that member's Member Portfolio. Member H/Content Participant also shows the new Collaboration A4 in the Master Profile A mirrored in that member's Member Portfolio. Note a stand-alone Master Profile or a mirrored Master Profile in a Members Portfolio, display the Creative work and all renditions of that Creative work.

EXAMPLE 9

According to an exemplary embodiment of Example 9 illustrated by FIG. 13, Member A had set the Working Profile Preferences for Collaboration A3 to be "Open to Collaboration." The Content Controller/Member A makes Collaboration A3 Open to Collaboration. Group 3 searches the community to find a Creative Work to collaborate on. Next, Group 3 contacts the Content Controller/Member A about collaborating on Collaboration A3. Next, the Content Controller/Member A accepts the invitation to collaborate with Group 3 and the Content Controller/Member A sets the Working Profile Preferences and makes "Group 3" Content Participants. Now referring to FIG. 14, the CWCS generates Collaboration agreements for all the members based on the Working Profile Preferences. Next, both the Content Controller and the Content Participants receive links to e-sign the Collaboration agreements.

Both the Content Controller and the Content Participants review and e-sign the Collaboration agreements, which, in some preferred embodiments, is stored in the CWCS and presented to Group 3/Content Participants online. In some preferred embodiments, Group 3/Content Participants execute the Collaboration Agreement document digitally. In some preferred embodiments, execution of the Collaboration Agreement is authenticated via means such as those used by e-Original (See eoriginal.com.) In some preferred embodiments, execution of the Collaboration Agreement is authenticated via mail or post.

In some embodiments, two actions happen substantially simultaneously or in parallel: (i) the collaboration agreement, in this example, is attached to Creative Work A as Collaboration A5 in the Master Profile A, and (ii) a Working Profile is created for Group 3/Content Participants and the Content Controller. Next, Group 3/Content Participants and the Content Controller/Member A complete the collaboration and a new incarnation/rendition of Collaborations A3 is created, "Collaboration A5." The new rendition is locked and added to Master Profile A. Now, all collaborated projects are automatically made Released. Finally, the Master Profile A is mirrored in all collaborators portfolios.

Now referring again to FIG. 10, Master Profile A includes the new Collaboration A5 as part of Master Profile A. (Note that in Example 9 the Master Profile A will only include Creative Work A, Collaboration A1, Collaboration A2, Collaboration A3, Collaboration A4 and Collaboration A5 listed in the diagram.) The Content Controller/Member A has Collaboration A5 mirrored in their Member Portfolio. Group 3/Content Participants also show the new Collaboration A5 in the Master Profile A mirrored in their Member Portfolio. Note a stand-alone Master Profile or a mirrored Master Profile in a Members Portfolio, display the Creative work and all renditions of that Creative work.

In some embodiments, a Member Portfolio has the potential to have multiple or even an infinite number of Master Profiles mirrored in the Member Portfolio. According to an exemplary embodiment illustrated by FIG. 15, a Master Profile's Mirrored on Members Portfolio Example, three Member Portfolios and the eight unique Master Profiles ranging from 1 to 95,012 are mirrored in their Member Portfolios. For Example: In Master Profile 1 Jack Doe collaborated on Collaboration's 1, 2, and 3. Jane Doe collaborated on Collaboration 1. In Master Profile 3, Jack Doe and Jane Doe created the Creative Work for this Master Profile. In Master Profile 56, Jack Doe was involved in creating Creative Work, Collaboration 2, and Collaboration 3. Jane Doe was involved in creating Collaboration 4. In Master Profile 115, Jack Doe was involved in creating Collaboration 2 and Jane Doe was involved in Collaboration 2. In Master Profile 542, Jane Doe was involved in creating Collaboration 1. In Master Profile 956, Jack Doe was involved in creating Collaboration 2. John Doe was involved in creating the Creative Work, Collaboration 2, and Collaboration 3. Jane Doe was involved in creating Collaboration 3. In Master Profile 10,254, Jane Doe was involved in creating the Creative Work and Collaboration 3. In Master Profile 95,012, John Doe was involved in creating Collaboration 3 and Collaboration 4. Jane Doe was involved in creating the Creative work, Collaboration 1, 3, and 4.

The terms defined herein, and grammatical variations thereof, are intended to be construed broadly so that the meanings will reasonably effectuate the broadest interpretation of all of the parts of this disclosure in which they are used.

For example, the term "updating" refers, for example, to simultaneous or substantially simultaneous updating in some embodiments and non-synchronous updating in some embodiments. For example, in general, and in many of the embodiments of the invention disclosed, updating of a file or other feature of the CWCS is intended to occur as soon as possible after an event requiring updating occurs. But in some instances regarding the use of the CWCS, such as where an approval is required, updating, according to some embodiments, is non-synchronous or delayed until the happening of one' or more other events, such as the obtaining of an approval, a signed agreement, etc.

After various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

All reasonable variants of the examples and other parts of this disclosure are intended to be, and shall be deemed to be, set forth herein as if incorporated herein in full.

The above-described embodiments can be implemented using hardware, software, or a combination thereof. When implemented in software, the software code can be executed on any suitable processor or collection of processors, whether provided in a single computer system ("computer") or distributed among multiple computers.

Further, it should be appreciated that a computer may be embodied in any of a number of forms, such as a rack-mounted computer, a desktop computer, a laptop computer, a server computer, a cloud-based computing environment, a tablet computer, etc. According to various embodiments, a computer includes one or more of any of those options, or the like, or is embedded in a device not generally regarded as a computer but with suitable processing capabilities, including a Personal Digital Assistant (PDA), a smart phone, or any other suitable portable or fixed electronic device.

Various embodiments include hardware devices, as well as program products including computer-readable, non-transient storage media for carrying or having data or data structures stored thereon for carrying out processes as described herein. Such non-transient media, in various embodiments are any available media that can be accessed by a general-purpose or special-purpose computer or server. By way of example, such non-transient storage media include, in various embodiments, random-access memory (RAM), read-only memory (ROM), erasable programmable read-only memory (EPROM), electrically erasable programmable read-only memory (EEPROM), field programmable gate array (FPGA), flash memory, compact disk, or other optical disk storage, magnetic disk storage or other magnetic storage devices, or any other medium which can be used to carry or store desired program code in the form of computer-executable instructions or data structures and which can be accessed by a general-purpose or special-purpose computer. Combinations of the above are also be included within the scope of non-transient media, in some embodiments. In various embodiments, volatile computer memory, non-volatile computer memory, or combinations of volatile and non-volatile computer memory is included within the scope of non-transient storage media. Computer-executable instructions according to various embodiments include, for example, instructions and data that cause a general-purpose computer, special-purpose computer, or special-purpose processing device to perform a certain function or group of functions.

In addition to a system, various embodiments are described in the general context of methods and/or processes, which are implemented in some embodiments by a program product including computer-executable instructions, such as program code. These instructions, according to various embodiments, are executed by computers in networked environments. The terms "method" and "process" are synonymous unless otherwise noted. Generally, program modules according to various embodiments, include routines, programs, objects, components, data structures, or the like, that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout are operated in a networked environment using logical connections to one or more remote computers having processors. Logical connections according to some embodiments include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments encompass many types of computer system configurations in some embodiments, including personal computers, hand-held devices, multi-processor systems, microprocessor-based or programmable consumer electronics, network personal computers, minicomputers, mainframe computers, and the like.

In some embodiments, the method(s) and/or system(s) discussed throughout are operated in distributed computing environments in which tasks are performed by local and remote processing devices that are linked (such as by hard-wired links, wireless links, or by a combination of hardwired or wireless links) through a communications network. In a distributed computing environment, according to some embodiments, program modules are located in both local and remote memory storage devices. Data, in various embodiments, is stored either in repositories and synchronized with a central warehouse optimized for queries and/or for reporting, or stored centrally in a database (e.g., dual use database) and/or the like.

According to various embodiments, various methods or processes outlined herein are coded and executable on one or more processors that employ any one of a variety of operating systems or platforms. Additionally, such software is written using any of a number of suitable programming languages and/or programming or scripting tools, and, according to some embodiments, compiled as executable machine language code or intermediate code that is executed on a framework or virtual machine. In various embodiments, the computer-executable code includes code from any suitable computer programming or scripting language or is compiled from any suitable computer-programming language, such as, but not limited to, ActionScript, C, C++, C#, Go, HTML, Java, JavaScript, JavaScript Flash, JSON, Objective-C, Perl, PHP, Python, Ruby, Visual Basic, or XML.

In this respect, various inventive concepts are embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. The recitation of a module, logic, unit, or circuit configured to perform a function includes discrete electronic and/or programmed microprocessor portions configured to carry out the functions. For example, in various embodiments, different modules or unit that perform functions are embodied as portions of memory and/or a microprocessor programmed to perform the functions.

Additionally, it should be appreciated that according to one aspect, one or more computer programs that, when executed, perform methods of the present invention, need not reside on a single computer or processor, but are distributed in a modular fashion amongst a number of different computers or processors to implement various aspects of the present invention.

In various embodiments, displaying information includes outputting the information to from a server 10 to a user device 12. In some of those environments, at least some of the information output to the user device 12 is provided to a user, or related information is provided to the user. In some embodiments, displaying information includes outputting information to a display, such as, but not limited to, a monitor, LCD screen, plasma screen, projector, television, or the like.

The indefinite articles "a" and "an," as used herein in the specification and in the claims, unless clearly indicated to the contrary, should be understood to mean "at least one."

Although the foregoing is described in reference to specific embodiments, it is not intended to be limiting or disclaim subject matter. Rather, the invention as described herein is defined by the following claims, and any that may be added through additional applications or other proceedings. The inventors intend no disclaimer or other limitation of rights by the foregoing technical disclosure.

What is claimed is:

1. A system of tracking collaboration, comprising:
a processor configured for accessing an environment on a communication network for collaboration between a plurality of users on one or more collaborative works that are based on one or more source works; and
a non-transient, computer-readable storage medium that is operatively coupled to the processor and stores information regarding a collaboration on at least one of the collaborative works;
the processor further configured to:
receive input data including at least a portion of a source work, and store the input data into a master profile associated with the portion of the source work, the portion of the source work including initial content for use in at least one collaboration of two or more of the users to form at least one collaborative work, the master profile including a working profile for each collaborative work, where each collaborative work is stored in the master profile in association with the working profile for the collaborative work;
receive input data associated with terms and conditions of an agreement that is associated with at least one of the working profiles, and store the input data associated with terms and conditions in association with the at least one working profile, wherein the agreement is by the two or more users for at least one collaborative work associated with the at least one working profile, wherein the terms or conditions relate to at least one aspect of the at least one collaborative work associated with the at least one working profile; and
access, in the master profile, data associated with at least one collaborative work that is based on the portion of the source work inputted into the master profile, each collaborative work including additional content provided by at least one of the two or more users, in accordance with the terms and conditions of the agreement associated with the working profile for the at least one collaborative work.

2. The system of claim 1, wherein the processor is further configured to receive and store input data associated with a member profile for one of the users, the member profile including a copy of each working profile for each collaborative work in which said one user participates.

3. The system of claim 1, wherein the agreement comprises, at least one of:
an assignment of rights document, a use agreement, a creative contribution authorization, an investment agreement, a financing agreement, a crowd funding agreement, or a contribution credit.

4. The system of claim 1, wherein the processor is further configured to store, in the non-transient, computer-readable storage medium, data for a plurality of separate working profiles for corresponding collaborative works, each of the separate collaborative works being based on the portion of the source work of the master profile for which the working profiles are associated, each working profile including at least one of: a work draft, derivative work related to the collaboration, or accounting data.

5. The system of claim 1, wherein the processor is further configured to:
receive and store, into the master profile, data associated with at least one collaborative work that is based on the portion of the source work in the master profile, each collaborative work including additional content, wherein the additional content builds on the initial content.

6. The system of claim 5, wherein the initial content comprises, at least one of: an audio work, a video work, an audiovisual work, a written work, a computer game, software, a photographic work, an artistic image, a log, a synthespian work, a virtual product, a live work, a trademark, an invention, or a business or company formation.

7. The system of claim 1, wherein the processor is further configured to:
receive and store in the master profile, a preference parameter that indicates, in a first state that the source work associated with the master profile is open to collaboration so that a collaborative work of one or more other users can be stored in the master profile, and in a second state that the collaborative work is closed to collaboration so that collaborative works having additional content will not be stored in the master profile with the initial content.

8. The system of claim 1, wherein the processor is further configured to access, in the master profile, data associated with terms and conditions of the agreement that is associated with the working profile for a collaborative work that is based on a portion of the source work in the master profile.

9. The system of claim 1, further comprising at least one plug-in software module for configuring the processor to access the environment for collaboration and store the information regarding collaboration.

10. The system of claim 1, wherein:
the processor and the non-transient computer-readable storage medium are provided on a user device connected for communication on the communication network;
the processor is further configured to store in the non-transient computer-readable storage medium at least a portion of the master profile, wherein the master profile is associated with the portion of the source work; and
the processor is further configured to update the portion of the master profile stored in the non-transient computer-readable storage medium based on data received from at least one other processor connected for communication on the communication network.

11. The system of claim 1, wherein the working profile includes data defining at least one collaboration preference relating to at least one collaborative work, the at least one collaboration preference corresponding to at least one crowd funding opportunity, crowd sourcing opportunity, time limit for duration of the at least one collaborative work, ownership of the at least one collaborative work, one or more revenue sharing arrangements for the at least one collaborative work, financing for the at least one collaborative work, one or more payment requirements for the at least one collaborative work, one or more licensing agreement relating to the at least one collaborative work, one or more marketing agreement relating to the at least one collaborative work, one or more advertising agreement relating to the at least one collaborative work, one or more exploitation agreement relating to the at least one collaborative work, one or more distribution agreement relating to the at least one collaborative work.

12. The system of claim 1, wherein the processor is further configured to connect with one or more crowd funding portals on the communication network, crowd funding computer applications or crowd funding transaction engines for seeking funds for one or more collaborative works.

13. A method of tracking collaboration on a user device having a processor and a non-transient, computer-readable storage medium, comprising:
accessing, using the processor, an environment on a communication network for collaboration between a plurality of users on one or more collaborative works that are based on one or more source works; and storing, in the non-transient, computer-readable storage medium, information regarding a collaboration on at least one of the collaborative works;

wherein storing information comprises:

inputting, using the processor, data-including at least a portion of a source work, in a master profile associated with the portion of the source work, the portion of the source work including initial content for use in at least one collaboration of two or more of the users to form at least one collaborative work, the master profile including a working profile for each collaborative work, where each collaborative work is stored in the master profile in association with the working profile for the collaborative work;

inputting, using the processor, data associated with terms and conditions of an agreement associated with at least one of the working profiles, and storing inputted data associated with terms and conditions in association with the at least one working profile, wherein the agreement is by the two or more users for at least one collaborative work associated with the at least one working profile, wherein the terms or conditions relate to at least one aspect of the at least one collaborative work associated with the at least one working profile; and accessing, in the master profile, data associated with at least one collaborative work that is based on the portion of the source work inputted into the master profile, each collaborative work including additional content provided by at least one of the two or more users, in accordance with the terms and conditions of the agreement associated with the working profile for the at least one collaborative work.

14. The method of claim 13, further comprising:

storing, in the non-transient, computer-readable storage medium, data associated with a member profile for one of the users, the member profile including a copy of each working profile for each collaborative work in which said one user participates.

15. The method of claim 13, wherein the stored agreement comprises, at least one of: an assignment of rights document, a use agreement, a creative contribution authorization, an investment agreement, a financing agreement, a crowd funding agreement, or a contribution credit.

16. The method of claim 13, wherein storing a working profile for each collaborative work comprises:

storing, in the non-transient, computer-readable storage medium, data for a plurality of separate working profiles for corresponding separate collaborative works, each of the separate collaborative works being based on the portion of the source work of the master profile for which the working profiles are associated, each working profile including at least one of: a work draft, derivative work related to the collaboration, or accounting data.

17. The method of claim 13, wherein inputting data in the master profile associated with the source work comprises:

inputting, into the master profile, data associated with at least one collaborative work that is based on the portion of the source work in the master profile, each collaborative work including additional content, wherein the additional content builds on the initial content.

18. The method of claim 17, wherein the initial content comprises, at least one of: an audio work, a video work, an audiovisual work, a written work, a computer game, software, a photographic work, an artistic image, a log, a synthespian work, a virtual product, a live work, a trademark, an invention, or a business or company formation.

19. The method of claim 13, wherein:

inputting, into the master profile, a preference parameter that indicates, in a first state that the source work associated with the master profile is open to collaboration so that a collaborative work of one or more other users can be stored in the master profile, and in a second state that the collaborative work is closed to collaboration so that collaborative works having additional content will not be stored in the master profile with the initial content.

20. The method of claim 13, further comprising accessing, in the master profile, data associated with terms and conditions of the agreement that is associated with the working profile for a collaborative work that is based on a portion of the source work in the master profile.

21. The method of claim 13, wherein accessing an environment for collaboration comprises, providing a plug-in software module in an electronic communication device, the plug-in software module including software for allowing a user of the electronic communication device to access the environment for collaboration and store the information regarding collaboration.

22. The method of claim 13, the method further comprising storing in the non-transient computer-readable storage medium at least a portion of the master profile, wherein the master profile is associated with the portion of the source work; and updating the portion of the master profile stored in the non-transient computer-readable storage medium based on data received from at least one other processor connected for communication on the communication network.

23. The method of claim 13, wherein the working profile includes data defining at least one collaboration preference relating to at least one collaborative work, the at least one collaboration preference corresponding to at least one crowd funding opportunity, crowd sourcing opportunity, time limit for duration of the at least one collaborative work, ownership of the at least one collaborative work, one or more revenue sharing arrangements for the at least one collaborative work, financing for the at least one collaborative work, one or more payment requirements for the at least one collaborative work, one or more licensing agreement relating to the at least one collaborative work, one or more marketing agreement relating to the at least one collaborative work, one or more advertising agreement relating to the at least one collaborative work, one or more exploitation agreement relating to the at least one collaborative work, one or more distribution agreement relating to the at least one collaborative work.

24. The method of claim 13, further comprising connecting with one or more crowd funding portals on the communication network, crowd funding computer applications or crowd funding transaction engines for seeking funds for one or more collaborative works.

* * * * *